US011526325B2

United States Patent
Stankoulov

(10) Patent No.: US 11,526,325 B2
(45) Date of Patent: Dec. 13, 2022

(54) PROJECTION, CONTROL, AND MANAGEMENT OF USER DEVICE APPLICATIONS USING A CONNECTED RESOURCE

(71) Applicant: Abalta Technologies, Inc., San Diego, CA (US)

(72) Inventor: Pavel Stankoulov, San Diego, CA (US)

(73) Assignee: Abalta Technologies, Inc., San Diego, CA (US)

( * ) Notice: Subject to any disclaimer, the term of this patent is extended or adjusted under 35 U.S.C. 154(b) by 0 days.

(21) Appl. No.: 17/135,030

(22) Filed: Dec. 28, 2020

(65) Prior Publication Data

US 2021/0200501 A1 Jul. 1, 2021

Related U.S. Application Data

(60) Provisional application No. 62/954,374, filed on Dec. 27, 2019.

(51) Int. Cl.
*G06F 3/14* (2006.01)
*G06F 3/0481* (2022.01)

(52) U.S. Cl.
CPC .......... *G06F 3/1462* (2013.01); *G06F 3/0481* (2013.01)

(58) Field of Classification Search
CPC .............. H01L 27/323; H01L 27/3246; H01L 51/0097; H01L 51/5253; H01L 51/56; G06F 3/0445; G06F 3/0412
USPC ........... 345/2.2, 173; 709/203, 224; 715/702
See application file for complete search history.

(56) References Cited

U.S. PATENT DOCUMENTS

| | | |
|---|---|---|
| 5,757,359 A | 5/1998 | Morimoto et al. |
| 7,339,493 B2 | 3/2008 | El Zabadani et al. |
| 7,574,691 B2 | 8/2009 | Freitas et al. |
| 9,053,146 B1* | 6/2015 | Kapoor ................. G06F 16/242 |
| 9,392,315 B1 | 7/2016 | Lang et al. |
| 9,451,319 B2 | 9/2016 | Maitre et al. |

(Continued)

FOREIGN PATENT DOCUMENTS

| | | |
|---|---|---|
| CN | 104854004 B | 9/2017 |
| JP | 2009260818 | 3/2011 |

(Continued)

*Primary Examiner* — Prabodh M Dharia
(74) *Attorney, Agent, or Firm* — Genius Patent APC; Bruce Angus Hare

(57) ABSTRACT

A gateway that projects user device application content (e.g., streaming video) to a connected resource is described. The user device may be an electronic device such as a smart phone, tablet, wearable device, etc. The connected resource may be a device such as a vehicle head unit. Application content may be associated with any applications that may be executed by the user device, such as media streaming services, games, etc. User inputs received at the connected resource may be applied at the user device via the gateway by translating the received user input data, as appropriate, and emulating the received inputs at the user device. Applications may be recognized by the gateway such that application content may be filtered or otherwise processed or managed, as appropriate. Machine learning may be used to train models associated with application or content recognition, rules associated with operating restrictions, and/or other such elements.

23 Claims, 12 Drawing Sheets

(56) References Cited

U.S. PATENT DOCUMENTS

| | | | |
|---|---|---|---|
| 10,271,766 B1* | 4/2019 | Parker, Jr. | A61B 5/0836 |
| 2005/0091359 A1 | 4/2005 | Soin et al. | |
| 2005/0198353 A1 | 9/2005 | Zmrzli | |
| 2005/0234864 A1 | 10/2005 | Shapiro | |
| 2006/0212621 A1 | 9/2006 | Ash et al. | |
| 2006/0250389 A1 | 11/2006 | Gorelenkov | |
| 2006/0282855 A1 | 12/2006 | Margulis | |
| 2007/0146347 A1 | 6/2007 | Rosenberg | |
| 2008/0201751 A1 | 8/2008 | Ahmed et al. | |
| 2008/0205389 A1 | 8/2008 | Fang et al. | |
| 2009/0022120 A1 | 1/2009 | Buer et al. | |
| 2010/0031299 A1 | 2/2010 | Harrang et al. | |
| 2010/0060571 A1 | 3/2010 | Chen et al. | |
| 2010/0259491 A1 | 10/2010 | Rajamani et al. | |
| 2011/0093805 A1 | 4/2011 | Ekhager et al. | |
| 2011/0131520 A1 | 6/2011 | Al-Shaykh et al. | |
| 2011/0210983 A1 | 9/2011 | Theimer et al. | |
| 2011/0271195 A1 | 11/2011 | Bose et al. | |
| 2012/0038679 A1 | 2/2012 | Yun et al. | |
| 2012/0069131 A1 | 3/2012 | Abelow | |
| 2012/0079551 A1 | 3/2012 | Isozaki et al. | |
| 2012/0081353 A1 | 4/2012 | Yusupov et al. | |
| 2012/0092277 A1* | 4/2012 | Momchilov | G09G 5/003 345/173 |
| 2012/0117145 A1 | 5/2012 | Clift et al. | |
| 2012/0144299 A1* | 6/2012 | Patel | G06F 3/0488 715/702 |
| 2012/0172088 A1 | 7/2012 | Kirch et al. | |
| 2012/0179553 A1 | 7/2012 | Duggal | |
| 2012/0319927 A1 | 12/2012 | Khatib | |
| 2013/0106750 A1* | 5/2013 | Kurosawa | G06F 9/452 345/173 |
| 2014/0040767 A1 | 2/2014 | Bolia | |
| 2014/0082511 A1* | 3/2014 | Weissberg | G06F 9/452 715/740 |
| 2014/0094112 A1 | 4/2014 | Agnihotri et al. | |
| 2014/0108585 A1 | 4/2014 | Barton et al. | |
| 2014/0156734 A1* | 6/2014 | Stankoulov | H04L 65/602 709/203 |
| 2014/0310599 A1 | 10/2014 | Clift et al. | |
| 2014/0340283 A1 | 11/2014 | Steckley et al. | |
| 2015/0143504 A1* | 5/2015 | Desai | H04L 63/0245 709/224 |
| 2015/0193108 A1 | 7/2015 | Li et al. | |
| 2015/0363481 A1* | 12/2015 | Haynes | G06Q 10/10 707/748 |
| 2016/0057790 A1 | 2/2016 | Sim | |
| 2017/0011606 A1* | 1/2017 | Ceccon | G06Q 20/208 |
| 2017/0098329 A1 | 4/2017 | Westerhoff et al. | |
| 2018/0300423 A1* | 10/2018 | Dufour | G06F 16/9577 |
| 2019/0196851 A1 | 6/2019 | Penilla et al. | |

FOREIGN PATENT DOCUMENTS

| | | |
|---|---|---|
| JP | 2011176591 A | 9/2011 |
| JP | 2012074771 A | 4/2012 |
| KR | 20130034893 A | 4/2013 |
| WO | 2014089114 | 6/2015 |

* cited by examiner

PROJECTION, CONTROL, AND MANAGEMENT OF USER DEVICE APPLICATIONS USING A CONNECTED RESOURCE

CROSS-REFERENCE TO RELATED APPLICATIONS

This application claims priority to U.S. Provisional Patent Application Ser. No. 62/954,374, filed on Dec. 27, 2019. U.S. Patent Publication number 2014/0156734, published on Jun. 5, 2014, is incorporated by reference herein.

BACKGROUND

User devices such as smart phones, tablets, etc. are ubiquitous. Likewise, connected resources such as in-vehicle systems are widely available. Thus, there is a need to allow interaction between user devices and connected resources.

BRIEF DESCRIPTION OF THE SEVERAL VIEWS OF THE DRAWINGS

The novel features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide a gateway that projects user device application content (e.g., streaming video) to a connected resource. The user device may be an electronic device such as a smart phone, tablet, wearable device, etc. The connected resource may be an electronic device, system, or component, such as a vehicle head unit. Application content may be associated with any applications that may be executed by the user device, such as media streaming services, games, etc.

User inputs received at the connected resource may be applied at the user device via the gateway. Such user inputs may include inputs received via, for example, a touchscreen or other user interface (UI) element of the connected resource. The user inputs may be applied at the user device by translating the received user input data, as appropriate, and emulating the received inputs at the user device (and user device application).

Applications may be automatically recognized by the gateway such that application content may be filtered or otherwise processed or managed, as appropriate. For instance, a video streaming application may be identified such that provision of video content may be restricted during vehicle operation. Such application recognition may utilize various recognition algorithms, such as color bin matching.

Machine learning may be used in some embodiments to train models associated with application or content recognition, rules associated with operating restrictions, and/or other such elements that may be utilized to implement various processes or algorithms related to application content projection, control, management, analysis, etc.

Figure 1:
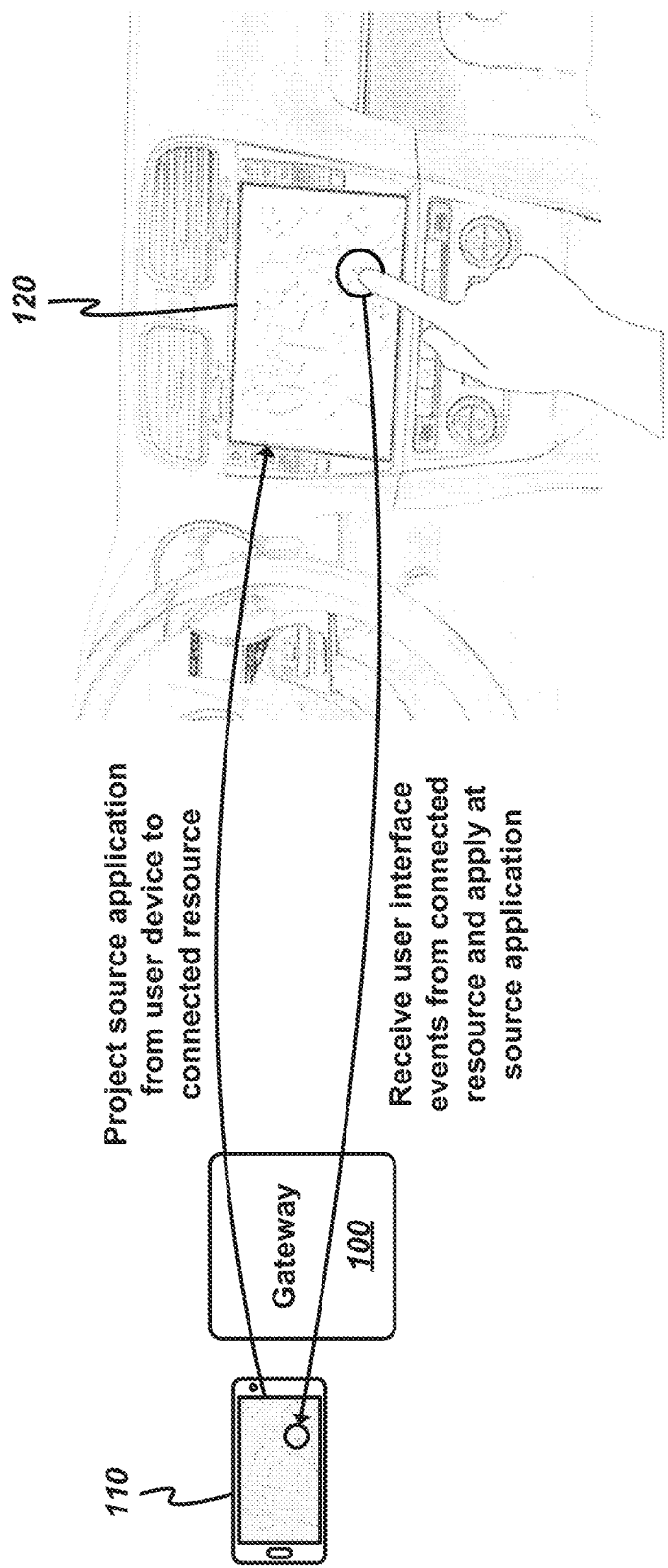
FIG. 1 illustrates an example overview of one or more embodiments described herein, in which an application is projected from a user device to a connected resource via a gateway.

FIG. 1 illustrates an example overview of one or more embodiments described herein, in which gateway 100 is used to project a source application from user device 110 to connected resource 120. As shown, user device 110 may project the source application to connected resource 120 via gateway 100. Further, gateway 100 may receive UI events from the connected resource 120 and apply the UI events at the source application running on user device 110.

Gateway 100 may be at least partially implemented at or by user device 110, connected resource 120, and/or other appropriate resources (e.g., a cloud-based server or other network-accessible resource). User device 110 may be a smart phone, tablet, wearable device, and/or other appropriate device or component that is able to execute instructions and/or communicate with other devices across one or more wired or wireless channels. Connected resource 120 may be a vehicle head unit, entertainment system or device, and/or other appropriate resource that is able to provide content and/or process UI data. Connected resource 120 may typically include a display screen.

In this example, user device 110 may execute a navigation application. The navigation application may be mirrored at connected resource 120 via gateway 100. User device 110 may communicate with connected device 0120 across a local wireless channel such as Bluetooth or Wi-Fi. Gateway 100 may receive application content from the navigation application and provide the application content in an appropriate format for the connected resource 120, such as by converting application content to bitmap images or vector data.

The application content in this example, may include image data such as map data, route indicators, etc. Further, the application content may include various UI elements, such as buttons, that may be provided with the image or other graphic data. In addition, connected resource 120 may include, provide, or otherwise implement various UI features associated with the source application. For instance, the display may be re-centered to a specified point or area based on a single tap identified at that location. As another example, the display may be zoomed in or out by varying a distance between two touch points (i.e., a "pinch" zoom). As another example, a double tap may be associated with selecting a destination for navigation.

In this example, a tap-and-drag event may be detected at connected device 120 and the associated data may be sent to user device 110 via gateway 110 for analysis and potential implementation at the source application. The tap-and-drag event may cause the displayed map area to be updated such that the selected point is moved to a new location. The source application may update the output display based on the received UI event data and provide the updated display (reflecting the new location of the selected point) to connected resource 120 via gateway 100.

Figure 2:
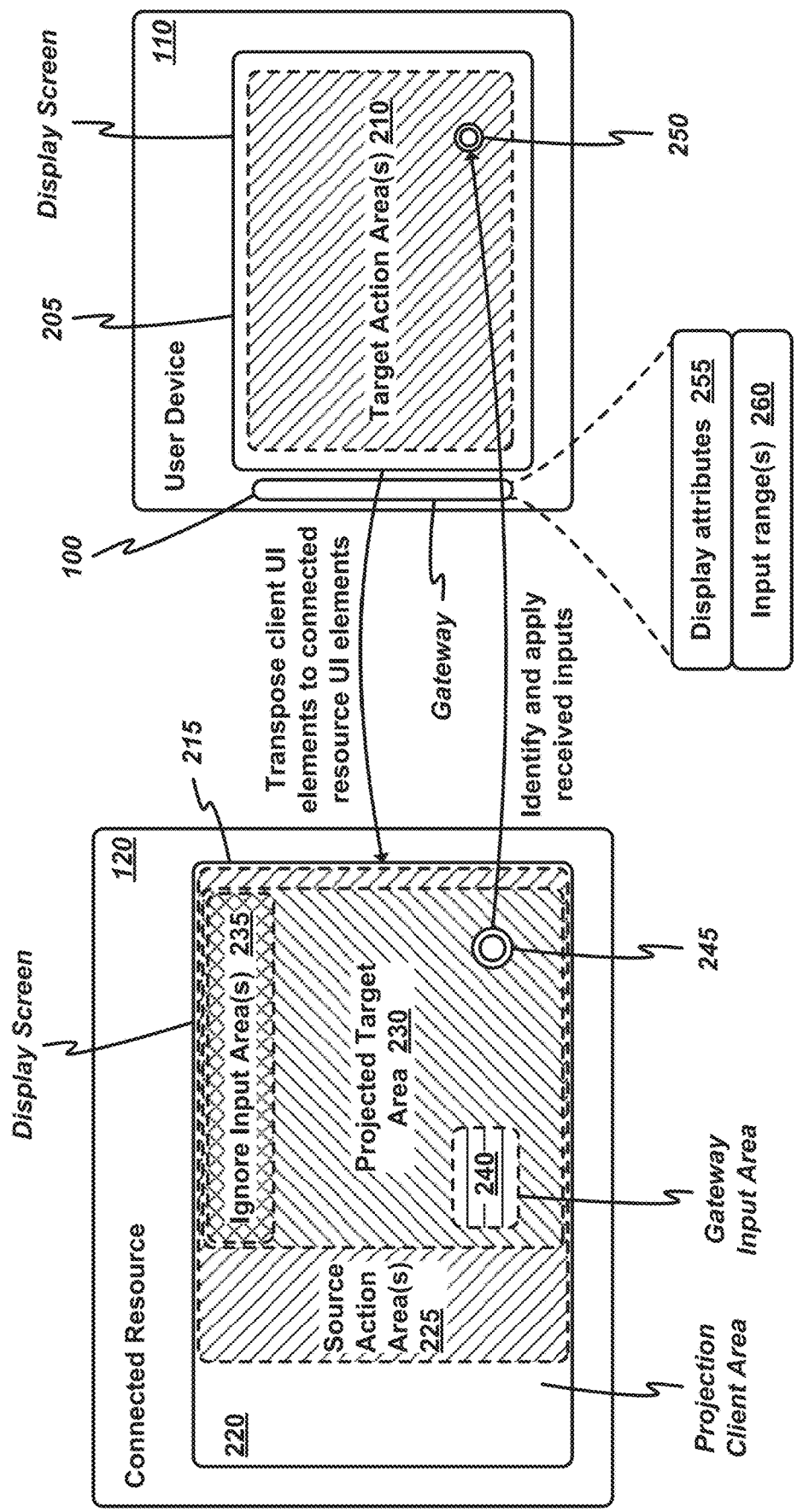
FIG. 2 illustrates an example overview of one or more embodiments described herein, in which user interface events are received at a connected resource and applied to a user device via a gateway.

FIG. 2 illustrates an example overview of one or more embodiments described herein, in which user interface events are received at connected resource 120 and applied to user device 110 via gateway 100. User device 110 and connected resource 120 may be communicatively coupled across a secure channel, such as a Bluetooth or Wi-Fi link. Communication between the resources may include and/or utilize various messaging protocols. The communication channel may utilize encryption and/or other security features.

In this example, user device 110 includes a display screen 205, such as a touchscreen display. User device 205 may include various other UI elements, such as buttons, a keypad, mouse, joystick, etc. The display screen 205 may be associated with one or more target action areas 210. In this example, the target action area 210 may be associated with all or nearly all of the surface of display screen 205. The target action area 210 may include area(s) on the display screen 205 (and/or other UI elements) that are associated with user input actions (or "events"). Target action area 210 may utilize a coordinate system associated with display screen 205.

Connected resource 120 may include a display screen 215, such as a touchscreen display. Connected resource 120 may include various other UI elements, such as buttons, a keypad, joystick, mouse, etc.

Gateway 100 may transpose the various UI features associated with user device 110 such that UI features associated with connected resource 120 may be utilized to provide similar functionality. In this example, display screen 215 includes a projection client area 220, one or more source action areas 225, a projected target area 230, one or more ignore input areas 235, and one or more gateway input areas 240. Different embodiments may include different types of areas (and/or other UI features) in various different arrangements than shown. For instance, areas may be different shapes than rectangular (e.g., round, oval, polygonal, etc.). As another example, various single areas may be divided into multiple areas or multiple areas may be combined into a single area.

Projection client area 220 may define one or more regions where events such as "point" events (e.g., touch, click, etc.) should be sent to the connected user device 110. The projection client area 220 may be represented as a rectangle and specified in the coordinate system of the display screen 215. Each of the other areas associated with connected resource 0120 may be described in, and relative to, the coordinate system of projection client area 220. The simplest shape for an area is a rectangle, but various other shapes may be utilized and/or supported.

Each source action area 225 may be an area associated with projection client area 220 that defines whether event data should be identified as an external UI event or a gateway user input event (or be ignored). In some embodiments, any event outside a source action area 225 and inside the projection client area 220 may be classified (and/or applied) as a gateway UI event. The source action area 225 may include a main action area and/or an ordered list of additional area items that may define one or more sets of exclusion and/or inclusion sub-regions.

Projected target area 230 may correspond to the target action area 210, or other area associated with display screen 205 that is projected to connected resource 120. Projected target area 230 may be described in, and relative to, the coordinate system of projection client area 220. Images captured at user device 110 may be stretched or shrunk to fit the dimensions of projected target area 230.

Each ignore input area 235 may be an area where UI events may be ignored. Inputs received via ignore input areas 235 may not be used to identify external or gateway input events. UI events associated with ignore input areas 235 may be associated with notifications in some embodiments.

Each gateway input area 240 may be associated with events that may be identified as gateway user input events, or user input events associated with management of gateway 100 and/or any associated resources.

Different embodiments may include various different types of areas based on the roles of each area (and associated events). For example, some embodiments may include one or more external input areas where any events associated with those areas may be identified as being an "external user input" event.

If areas overlap, each touch event may be evaluated to determine to which area a touch even should be associated. For instance, area matching may be based on order, where the most recently touched area may have precedence over previously touched areas.

As shown, a UI event 245 (e.g., associated with a touch or "click" event) may be received at projected target area 230 and emulated as if a click was applied at a corresponding click point 250 of target action area 210. The emulated UI event 250 may be recognized and applied by (or to) a source application running on user device 110. For example, a click at location 250 may cause a displayed map region to be updated (e.g., by placing the click location in the center of the displayed area) when using a navigation application.

In this example, gateway 100 may include, store, or utilize various sets of display attributes 255 and/or input ranges 260. Such display attributes 255 may include, for instance, sizes of user device and/or connected resource display screens. Input ranges 260 may include various definitions associated with various area shapes, sizes, and/or coordinates. For example, the input ranges 260 may specify the locations and sizes of areas 0220-240 and area 210.

Gateway 100 may utilize various other data elements, such as lists of input event types, parameters or attributes associated with events, thresholds or other criteria for identifying events, and/or other relevant data.

In some embodiments, the user input for connected resource 120 may be initialized after establishing a connection between user device 110 and connected resource 120 via gateway 100. The connected resource 120 may send an input capabilities message that indicates supported input features and associated capabilities. Gateway 100 may respond with a listing of available input features of the user device 110 in an input capabilities message. Gateway 100 may send a configure input message to the connected resource 120 (and/or associated client application) that defines the various input areas (or other features) and associated usage profiles. Gateway 100 may also define the projected target area 230. Connected resource 120 (and/or associated client application) may store the provided input areas. If any external user input areas have been defined or identified, the connected resource 120 may send such definitions to a device control module of the connected resource 120. The connected resource 120 may respond to gateway 100 with a configure input message that may include device identifiers (IDs) for each of the defined input areas.

The gateway 100 may reconfigure the input configurations at any time by resending a configure input message. After configuration, the gateway 100 may enable input handling for one or more input areas. The gateway 100 may send a control input message that specifies the area ID(s) of the input area(s) to be enabled and the area ID(s) of the input area(s) to disable. Multiple messages may be sent at any time to enable and/or disable one or more input areas.

Figure 3:
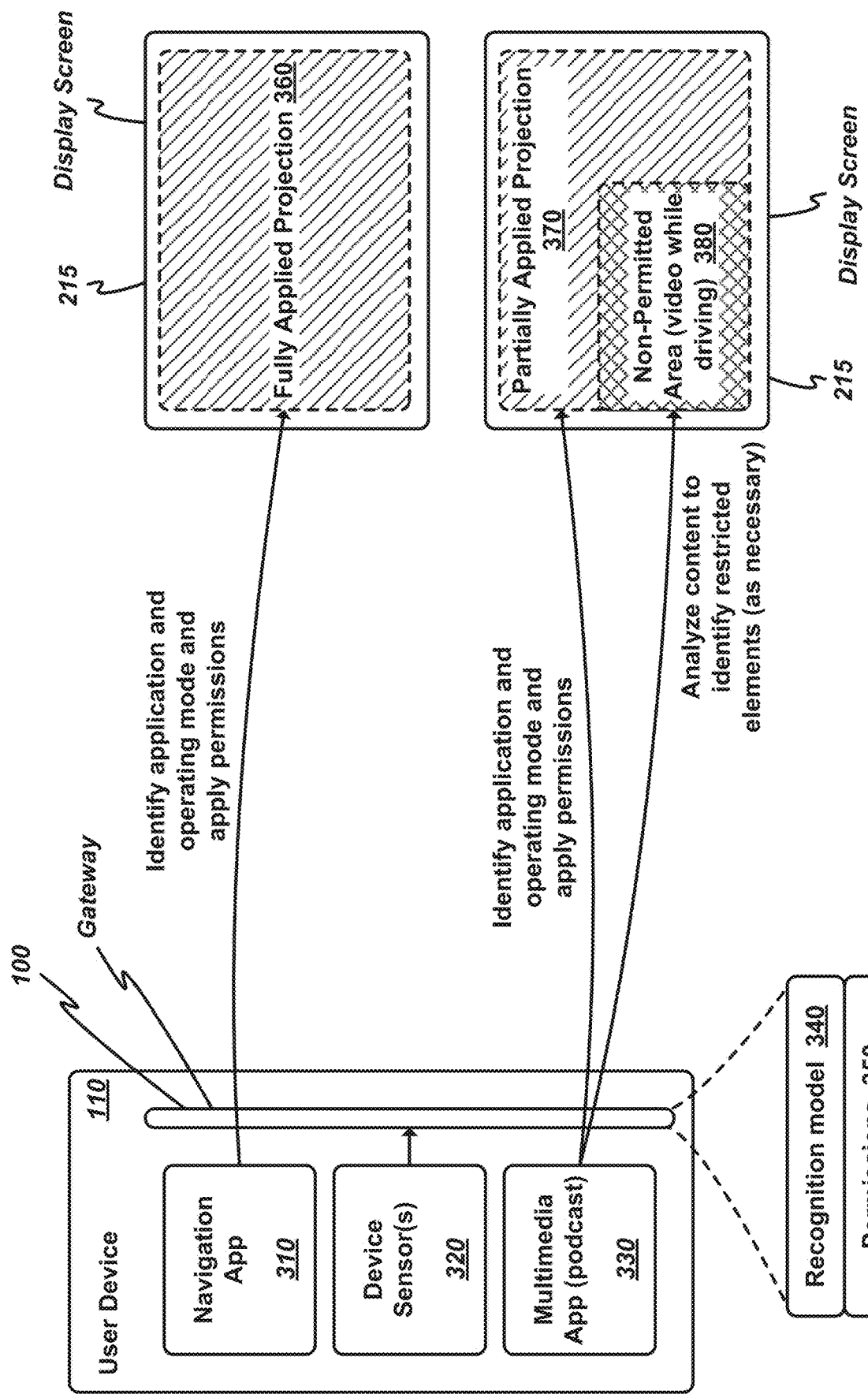
FIG. 3 illustrates an example overview of one or more embodiments described herein, in which applications are analyzed, recognized, and filtered using a gateway.

FIG. 3 illustrates an example overview of one or more embodiments described herein, in which applications are analyzed, recognized, and filtered using gateway 100. As shown, user device 110 may be associated with a navigation application 310, one or more device sensor interfaces 320, and a multimedia application 330.

Device sensors 320 may include various position sensors (e.g., accelerometers, gyroscopes, global positioning system (GPS) components, etc.) and/or other sensors that may be able to determine modes of operation. For instance, such device sensors 320 may be used to determine when a vehicle is stationery or moving. User device 110 may also receive sensor data from a connected resource 120 or another external resource. For instance, user device 110 may receive vehicle speed sensor data, parking brake state, and/or other such sensor data via connected resource 120.

Gateway 100 may receive device sensor data (and/or other appropriate data) and determine an operating mode associated with a connected resource 120. Operating modes may be associated with various types of connected systems or resources. For instance, a display associated with a vehicle head unit installed in a passenger car may be associated with modes such as "stationery", "in motion", etc. As another example, a display associated with an in-flight entertainment system may be associated with modes such as "taxi", "takeoff", "cruising", "public announcement", etc.

As shown, if gateway 100 is not able to receive application information from a user device interface (not shown), gateway 100 may utilize various recognition models 340 (also referred to herein as "matching" models), permissions 350, and/or other appropriate data elements. Such recognition models 340 may include image data and/or other data that may be utilized to identify applications running on user device 110. For instance, recognition models 340 may include captured images of application launch screens or other appropriate captured application content (e.g., video content, audio content, graphical content, etc.). Recognition models 340 may include sets of evaluation criteria (e.g., matching thresholds, minimum matching score or other metric, etc.).

Permissions 350 may include indications of which source application elements to project to a connected resource 120. For example, video streaming applications (or content elements) may be disabled when a vehicle is in motion in order to limit driver distraction. Application permissions 350 may be associated with applications, device types, operating modes, and/or other relevant attributes. For instance, permissions 350 for a video streaming application may indicate that video streaming should be disabled for a connected resource 120 associated with a front seat vehicle head unit while the vehicle is in motion. Video streaming may not be disabled for connected resources 120 associated with rear (or passenger) seat vehicle head units whether the vehicle is in motion or not.

In a first example, navigation application 310 may be associated with fully applied projection 360 where all available content is sent to display screen 215 without regard to mode of operation or other attributes.

In a second example, multimedia application 330 may be associated with partially applied projection 370 where some content associated with multimedia application 330 is disabled or blocked via non-permitted area 380. In this example, multimedia application 330 may provide audio and video content associated with a podcast. Partially applied projection 370 in such a case may include provision of audio content (and/or other non-video content) regardless of operating mode. A portion of the application content may be associated with streaming video that would be presented in non-permitted area 380 if not limited by operating mode permissions (e.g., blocking video content while in motion).

The non-permitted area(s) 380 (and/or other types of content filtering) may be applied based on pre-defined application elements (e.g., a video display window associated with an application) and/or automatically detected application elements. For instance, projected content may be analyzed to identify areas of one or more frames associated with video content (e.g., by comparing differences between frames to detect motion). Such content analysis may include analysis of various distracting (or otherwise undesirable) application content. For instance, bright and distracting colors may be dimmed. As another example, loud noises or those matching various profiles (e.g., car horn, siren, screeching tires, etc.) may by muted or provided at reduced volume.

Figure 4:
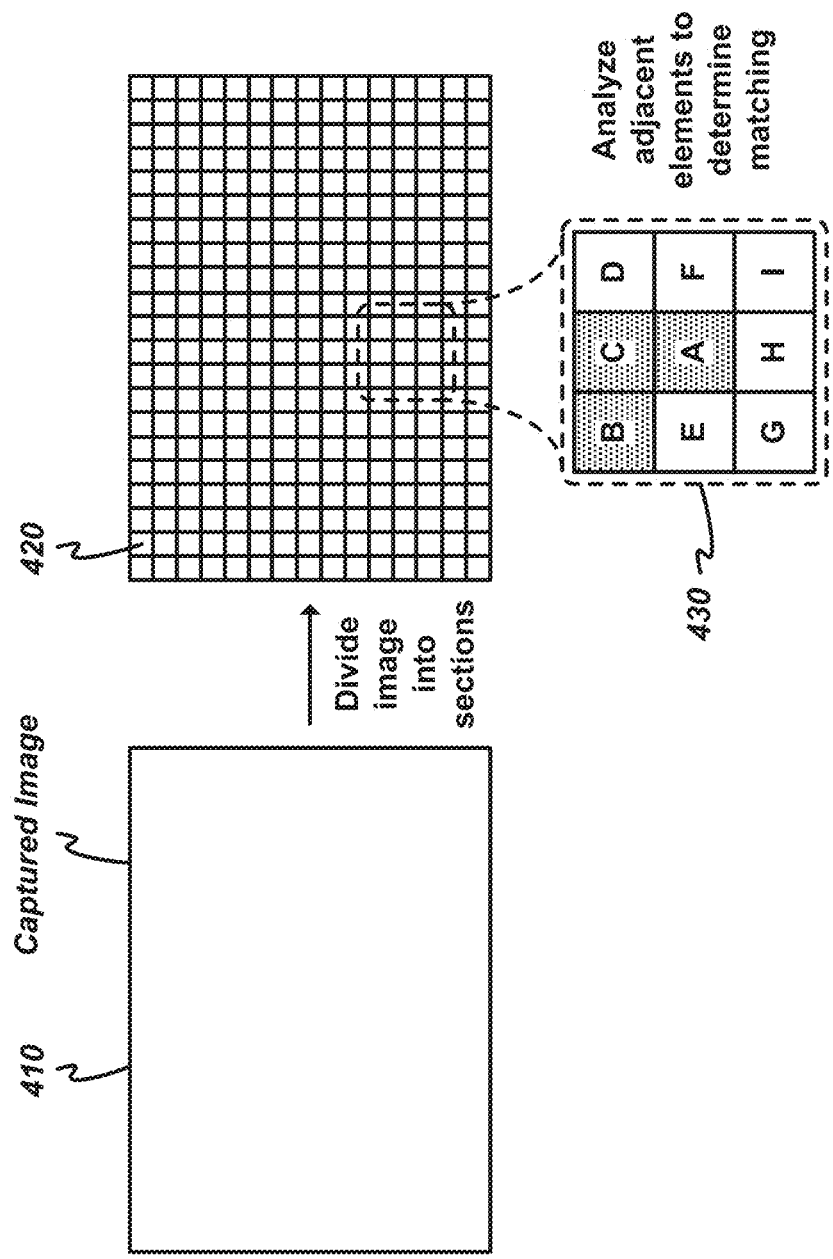
FIG. 4 illustrates an example image analysis technique of one or more embodiments described herein, in which neighboring image sections are compared to identify matching blocks.

FIG. 4 illustrates an example image analysis technique of one or more embodiments described herein, in which neighboring image sections or regions are analyzed to identify matching blocks. Gateway 100 may select from various image analysis algorithms based on various appropriate criteria. For instance, an algorithm may be selected in order to best utilize the capabilities of the user device 110 while satisfying a specified accuracy threshold. Algorithm selection will be described in more detail in reference to process 700 below.

Captured image 410 may be received from an active application via capture of projected screens and/or other information associated with the application. A library of similar images associated with various user device applications may be maintained by gateway 100 and/or other appropriate resources. Image analysis and generation of matching models will be described in more detail in reference to process 1100 below.

In some embodiments, gateway 100 may use color profile matching to analyze images and match the captured images (or portions thereof) to previously captured application screens (or portions thereof). Many or most applications may use consistent color schema for the various screens associated with, or generated by, the applications. As such, color profile matching may provide effective and efficient results in identifying applications.

During matching model training, a color profile may be created for each of the screens of a source application (or "source screens"). Similarly, a color profile may be calculated for the current captured image 410 in order to determine if the color profile of the captured image 410 matches the color profile of any of the source screens. A matching score or other calculated metric may be compared to a matching threshold to determine whether the captured image 410 matches a captured application screen. Such a color profile matching algorithm may require limited processor and memory usage, while being executed relatively quickly.

A color profile may be calculated for the current image 410. The color profile may be calculated by evaluating image sections (e.g., individual pixels, groups or "blobs" of pixels, etc.). The color profile may include any number of color "bins" and a section count associated with each bin (e.g., a number of pixels). Each pixel (or other image section) may be evaluated and the pixel color may be converted to a color bin. The number of bits for each color channel may be limited (e.g., using a color bin channel bits parameter) for more efficient analysis and storage of profile data. The color channels for each pixel (or other image section) may be combined into a single value (e.g., using a regular bitwise operation), such that, for instance, each pixel or other image section is associated with a single-color bin value that may act as a "key" in a color profile "dictionary". If the dictionary already includes the key, a count associated with the key may be incremented. If the dictionary does not include the key, a new entry may be added to the dictionary and the associated count set to one. Keys may be removed from the dictionary if the associated count is less than a threshold value.

The resulting color profile may be compared to the various stored color profiles in various appropriate ways. For instance, the color bins associated with the captured image 410 may be compared to color bins associated with a matching model. The number of extra or additional color bins associated with the captured image 410 relative to the number of color bins associated with the model may be calculated. Likewise, the number of matching color bins between the captured image 410 and the model may be calculated.

A matching score may be calculated based on the number of matching color bins and the number of extra color bins. In some embodiments, the matching score may be a probability represented as a number ranging from zero to one. The number of matching color bins may be compared to a minimum matching threshold number. If the number of matching color bins is less than the minimum matching threshold, the matching score may be set to zero. If the number of extra color bins is greater than a maximum matching threshold, the matching score may be set to zero. If the number of extra color bins is less than or equal to a minimum extra matching threshold, the matching score may be set to one. If the number of matching color bins is greater than the minimum matching threshold, the number of extra color bins is less than the maximum matching threshold, and the number of extra color bins is greater than the minimum extra matching threshold, the matching score may be calculated by dividing the number of matching color bins by the total number of image color bins. In some embodiments, the matching score may include color bin weighting, where each color bin is associated with a count or other weighting factor. If the calculated matching score exceeds a matching threshold, the matching application may be identified by gateway 100 and associated with the calculated score.

Such a pixel-type (or other region or section type) color matching algorithm works well for application screens that have solid color widgets, such as buttons, background rectangles, circles, etc. However, some application screens might show photographic images or other graphic features that are not likely to have continuous areas of matching color due, for instance, to slightly different gradients of light or shading. For example, a navigation application may show a "street view" of a destination. As another example, a restaurant search application may show thumbnail photos of the restaurants in a result list. In such cases, if individual colors are counted, the photographic (or other high density) images will produce a large number of colors that are not useful for matching calculations. To overcome such limitations, gateway 100 may utilize or implement a runtime filter while counting the colors to only count colors for areas that have multiple sub-elements with matching colors (also referred to as "blobs").

In the example of FIG. 4, rather than analyzing individual sections independently, "blob" analysis is utilized by dividing the image 410 into sections 420 (e.g., pixels, sets of pixels, shape regions, etc.). In this example, each section 420 may represent one pixel. For such analysis, color bins of neighboring pixels may be evaluated. If some matching criteria is met (e.g., minimum number of adjacent matching elements), a color bin associated with the pixel or section under evaluation may be added to the dictionary (or the count of a matching color bin may be incremented). If the matching criteria is not met, the pixel or other section may be skipped (e.g., no color bin may be added to the dictionary and no count may be incremented).

In this example, each section 420 may be associated with a single pixel (center pixel "A"). As shown, in expanded view 430, a number of adjacent elements (pixels "B"–"I" in this example) may be evaluated to determine whether the pixel under evaluation (pixel A) is included in a color blob. Each pixel in the captured image 410 may be evaluated in a similar way.

Each pixel may be evaluated relative to neighboring pixels and if there is a minimum number of matching adjacent pixels (e.g., as determined by having the same color bin) to the center pixel, then the center pixel is identified as part of a blob and added to the color profile dictionary. Otherwise, the center pixel is skipped (e.g., by not adding the associated color bin to the color profile dictionary or not incrementing a count associated with the color bin).

The simplest neighboring pixel evaluation window is three by three, as shown. In some embodiments, at least two neighboring pixels must have the same color bin as the center pixel for a blob to be identified. For instance, in this example, shaded pixels A, B, and C may have matching color bins and thus, pixel A may be identified as being part of a blob and added to the color profile dictionary. In some embodiments, matching may be evaluated based on neighboring adjacent pixels. For instance, in this example, a match may be identified because neighboring adjacent pixels B and C match center pixel A, whereas if non-neighboring adjacent pixels B and G matched center pixel A, pixel A may not be identified as being part of a blob.

Different embodiments may utilize different regions, shapes, matching criteria, etc. in order to define or evaluate color blobs. For instance, using smaller evaluation windows allows faster processing of the image but also captures smaller (and thus more numerous) blobs. In the three-by-three example evaluation window, the smallest blob may include three pixels, as described above. To filter out smaller blobs, a larger evaluation window may be used. For example, in a five-by-five evaluation window, the smallest blob may be a nine-pixel (three by three) square. The size of the evaluation window may be specified in the matching model or may be based on some relevant criteria (e.g., image size, device processing power, etc.).

Matching model data associated with blob matching may include elements such as a color profile, color bin counting method, a color threshold, a number of color bin channel bits, an extra color bin minimum threshold, an extra color bin maximum threshold, a matching score minimum threshold, a blob window size or area definition, a blob matching count, and/or other relevant parameters.

The color profile may include information such as color bin identifiers, counts, etc. as described above. The color bin counting method may indicate the type of color bin counting to be used, such as all pixels, blobs only, etc. The color threshold may specify a minimum number of pixels that should match a given color bin in order to be included in the matching score calculation. Such an approach may filter out colors that have only few pixels and are not significant factors when classifying an image. The number of color bin channel bits (or other limiting factor) may specify the number of bits that should be used from each color channel of the image to be used in the color bins. For example, for a typical "RGB888" (red channel, green channel, and blue channel at eight bits per channel) format, the algorithm could reduce the color variations by fifty percent by using seven bits for each channel rather than eight.

The extra color bin minimum threshold may specify the number of extra color bins below which the image will be considered a total match (e.g., by assigning a matching score of one or one hundred percent). The extra color bin maximum threshold may specify the number of extra color bins above which the image will be considered a non-match (e.g., by assigning a matching score of zero). The matching score minimum threshold may specify a minimum matching score above which the matching score may be considered to indicate a match (e.g., a matching score minimum threshold may be eight tenths or eighty percent in some embodiments). The blob window size may specify a number of pixels (or other sections) to be evaluated when using a blob-based algorithm (e.g., nine pixels, twenty-five pixels, etc.). The blob window may further be associated with data elements such as shape definition elements (e.g., indicating a square shape, circular shape, etc.). The blob matching count may specify a minimum number of matching elements to be considered a match. For example, in the nine-pixel region described above, at least two other pixels must match the center pixel, thus the blob matching count may indicate three total pixels. Some embodiments may include other parameters associated with blob matching, such as associations between matching pixels (e.g., in the example above, two adjacent pixels must match the center pixel).

Another example algorithm that may be used to match screen capture images to applications is to search for specific image components at a given area of the captured image (also referred to as "image template matching"). Such image template matching may be effective when applied to applications that include a distinctive logo or original artwork icons on their screens, as many do. Other image elements, such as standard or generic icons (e.g., a magnifying class, settings icon, etc.) may be distinctive between applications and thus useful for calculating matching score. A matching model used for image template matching may include one or more image artifacts for which to search. The image template matching algorithm may scan an input image for any of the image artifacts and, if an image artifact is detected, return a label or identifier associated with the matching model associated with the image artifact. Such scanning may be performed by evaluating sections of the captured image 410, such as groups of pixels 420 and determining whether any scanned section matches an image artifact to at least a minimum matching threshold.

The image template matching algorithm may retrieve template images that match the screen density of user device 110 (and/or based on some other appropriate criteria). For each template image, the image template matching algorithm may compare the template image to the current input image using various difference-based calculations and may search the most likely location(s) of the current input image for the given template(s) and generate a matching score. The search area may be reduced using region of interest (ROI) based on matching model data, template data, captured image data, and/or other relevant factors. If the calculate score meets or exceeds a specified threshold value, the image template may be considered a match and an identifier of the matching application may be returned.

Matching model data associated with image template matching may include template images, template masks, comparison types, and/or various thresholds. Template image may include a listing of associated images for comparison to an input image. Images may include (or be associated with) information such as screen density (e.g., dots per inch or "dpi") such that images may be correctly scaled for comparison. Each template image may include an alpha channel that defines area that should be excluded from evaluation. The template mask may include a list of images that define a bitmap mask to be applied to the template images. Such a bitmap mask may indicate which part(s) of the template images to use for matching comparisons. The comparison types may indicate the type of template matching operation to use. For instance, various matrix transposition operations may be utilized, such as SQDIFF, SQDIFF_NORMED, CCORR, etc. Thresholds may include values such as threshold value or score above which the template matching operation should be considered a match.

Image template matching typically requires manual creation of the matching models. For instance, application screens may be evaluated to discern common templates on the screen. Template images may be extracted from the original screens and configured into matching models. In some embodiments, such model generation may be automated by obtaining a source application in distribution form (e.g., android package kit (APK) for android, iOS application archive (IPA) for iOS, etc.) and extract icon resources from the source application. Screen images captured from the application (also referred to as "training" images) may then be scanned for the appearance of any of the extracted icons. The scanning may utilize similar scoring and/or matching algorithms to those described above and below. The most commonly identified icons may be automatically added to a matching model.

Generation of matching models, and updates thereto, will be described in more detail in reference to process 1100 below.

Figure 5:
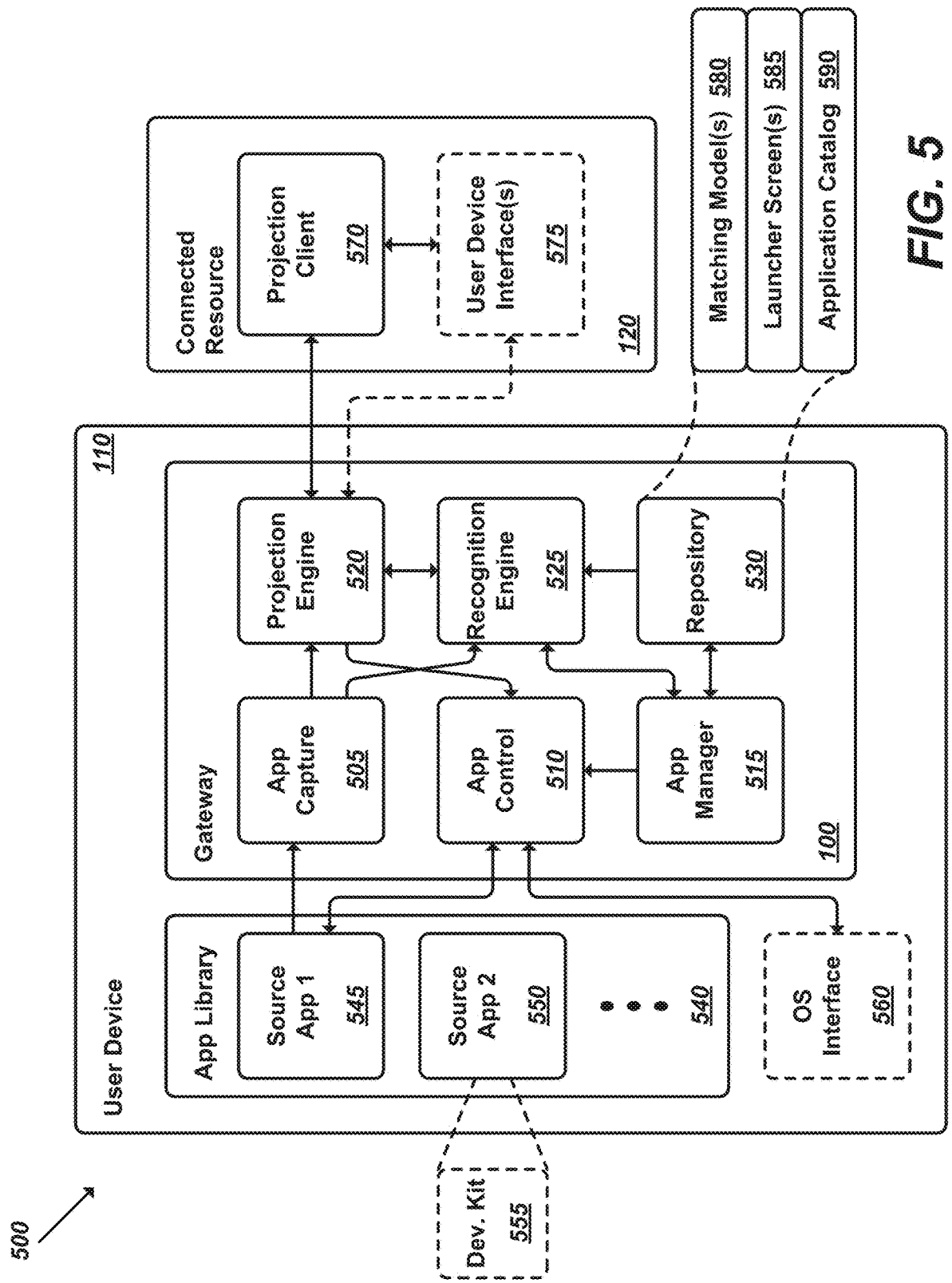
FIG. 5 illustrates an example environment in which one or more embodiments, described herein, may be implemented.

FIG. 5 illustrates an example environment 500 in which one or more embodiments, described herein, may be implemented. As shown, the environment 500 may include user device 110 and connected resource 120. Environment 500 may include various other devices (e.g., cloud-based devices), network communication channels, and/or other resources.

User device 110 may be a consumer electronic device that is able to execute instructions and/or otherwise process data, such as a smart phone (e.g., iOS, Android, etc.), smart watch, smart glasses, other smart devices, tablet, etc. User device 110 may at least partially include and/or implement gateway 100. Gateway 100 may capture and manage screens, audio, and/or other content from a source application 545 and may project the content to the connected resource 120. Gateway 100 may at least partly direct the operations of source application 545 (e.g., based on UI data received from connected resource 120). Each source application 545-550 may be a third-party application that a user would like to use with a connected resource 120.

Connected resource 120 may be any electronic system, device, or element that may be communicatively coupled to a user device 110 and that is able to utilize or otherwise interact with applications running on the user device 110 (or at least some functionality provided thereby). For example, the connected resource 120 may be in-vehicle system (e.g., a head-unit, infotainment system, rear-seat display, instrument cluster, smart-minor, etc.), medical system, smart TV, smart speaker, fitness equipment, smart-home device (e.g., an Internet of things (IoT) device), smart glasses, smart appliance, etc. The connected resource 120 may execute a dedicated process or application, which may be referred to as a "client" application or similar. In some embodiments, the connected resource 120 may include or provide various interfaces or connection features that may allow user device 110 to send and receive data to and from connected resource 120. Such interfaces or features may be included as operating system (OS) components or other non-dedicated resources in some embodiments. For instance, connected resource 120 may provide an application programming interface (API) or similar feature that may allow video content to be provided to the connected resource 120.

As shown, gateway 100 may include an application capture element 505, an application control element 510, an application manager 515, a projection engine 520, a recognition engine 525, and a repository 530. Gateway 100 may be able to access various user device features, such as application library 540, which may include various source applications 545-550 able to be executed by user device 110. In this example, source application 550 includes optional development kit 555. In some cases, gateway 100 may have access to an OS interface 560 that may provide information such as an active application identifier. Connected resource 120 may include a projection client 570 and/or optional user device interfaces 575.

Application capture element 505 may capture the screens or other output of user device 110 when running a source application 545. The application capture element 5050 may send the captured data to projection engine 520 or recognition engine 525 for further processing.

Application control element 510 may control or otherwise interact with the source application 545. The application control element 510 may launch applications provided by the application manager 515, simulate user events, perform screen transitions, cause execution of particular functions in the applications, and/or otherwise interact with a source application 545.

Application manager 515 may communicate with an external resource, such as a cloud-based server to manage elements associated with application detection and/or operation. The application manager 515 may store and/or manage application catalog 590 (or portions thereof) locally and may provide application information to other modules. The application manager may execute various application detection algorithms.

Projection engine 520 may implement screen projection to connected resource 120. The projection engine 520 may include or utilize various screen projection engines, such as WebLink, CarPlay, Android Auto, SDL, etc.

Recognition engine 525 may utilize image recognition and/or other identification algorithms to detect the active source application 545 and/or the active screen to project. On more restrictive user device systems, such as iOS, OS interface 560 may not be available or accessible (e.g., system APIs to detect an active application might not be provided) and the source application 545 may not include a development kit or other resource that may allow such interaction. In such cases, image recognition may be implemented by gateway 100.

Recognition engine 525 may load available matching models 580 associated with the application catalog 590 from repository 530. Recognition engine 525 may classify each image received into an application ID (and/or screen ID) and return the classification information to the application manager 515. Such classification may utilize the various image analysis algorithms described above and below. If the image cannot be recognized, indicating an unknown application, then the recognition engine 525 may report such unrecognized image status to the application manager 515.

The recognition engine 525 may implement one or more of the image classification algorithms described here based on various appropriate criteria (e.g., the capabilities of the user device 110, capabilities of the connected resource 120, user preferences, application configuration settings, etc. The matching model 585 may indicate which algorithm(s) to use, parameter values or other settings, etc.

Recognition engine 525 may use hardware accelerated machine learning (ML) capabilities of the user device 110 whenever possible. For example, for iOS, Core ML may be used or implemented. For Android, an on-device ML Kit may provide such capabilities. Popular third-party libraries, such as open-source computer vision library (OpenCV) may be used for some image classification and/or analysis operation.

As shown, the application catalog 590 may include or be associated with matching models 580 for the various supported applications. In some embodiments, common models may be stored (e.g., using data-only application records) in, or associated with, the application catalog 590. The recognition engine 525 may load available matching models 580 when the application catalog is initially downloaded (or built) or updated based on interaction with a server or similar resource such as a gateway manager described below. The matching models 580 may be processed by generating an empty list of rules (a "rule list"). For each application in the application catalog 590 recognition engine 525 may determine whether there is a matching model 580 associated with the application entry. Such a determination may be made in various appropriate ways, such as by analyzing the application entry (and/or associated data elements) to identify a listing of associated matching models 580.

If an associated model is identified, the recognition engine 525 may retrieve a root rule object from the model and add the rule to the rule list at a designated location. For example, if the new rule does not have a priority flag or property set, the rule may be added to the end of the list. If the new rule does have the priority property or flag set, the recognition engine 525 may search the rule list from the beginning and insert the new rule before the first rule that has a lower priority value than the current rule (or the first rule that does not have a priority value). After all applications have been processed, the rule list may thus include a list of all root rule objects from all matching models 580 associated with an application catalog 590 sorted by priority (and by the order in which they are listed in the application catalog). The rule list may be processed in order during the various recognition or analysis algorithms or operations described herein.

Once the models have been loaded, and the rule list generated, the recognition engine 525 may process a currently captured screen and return a detected application ID, screen ID, and/or other appropriate information. In some embodiments, the recognition engine 525 may process every captured screen. However, such an approach could lead to heavy system resource loading on the user device 110. Thus, in some embodiments the recognition engine 525 may use various gating features to determine (or indicate) whether a given screen image should be processed.

Gating features may include, for instance, time-based gating where the determination whether to analyze the current screen is based on a timer. For example, one screen may be analyzed every second. The gating interval duration may be adaptive based on parameters such as processing load and/or battery drain at the user device 110. For instance, if the processing load is high, the gating interval duration may be increased in order to reduce the processing load.

Another example gating feature may be on-change gating, where the determination whether to analyze the current screen is based on a calculated difference between the previous detected screen image and the current screen image. If the calculated difference exceeds a specified threshold, the current screen image may be analyzed. Such a difference comparison may be performed in various appropriate ways, including direct-image comparison and/or video-encoder signal analysis.

Direct image comparison may include comparison techniques such as color bin based analysis (as described in reference to color matching), pixel-by-pixel comparison (e.g., when a number of changed pixels exceeds a threshold value or ratio), a perceptual hashing algorithm (e.g., an algorithm that uses hashing to produce a snippet or fingerprint of various forms of media), threshold-based scene detection (e.g., the intensity and/or brightness of a current screen may be compared with a specified threshold value and analysis may be triggered when the intensity and/or brightness exceeds the threshold), and/or other appropriate direct image comparison algorithms.

Video encoder signal comparison may include using projection engine 520 (and/or associated video encoders) to perform scene detection based on the captured screen(s) being sent to projection client 570. For example, H264 format may use different types of frames. A key-frame (or "I" frame) may include a full scene, whereas "P" and "B" frames may include only changes. If there are no changes in a scene, the P and B frames will be small, and such information may be used by recognition engine 525 to determine whether to process the current screen. In some cases, a video encoder may implement internal scene detection logic (e.g., for better frame encoding), which could provide a separate signal to recognition engine 525 when a scene change is detected.

In some embodiments, a hybrid image recognition approach may be utilized. For instance, screen changes may be detected, and screen recognition may be performed at some specified interval regardless of whether any calculated difference exceeds a threshold or otherwise indicates a change.

If recognition engine 525 determines that a screen image should be analyzed, the recognition engine 525 may, for each rule object in the rule list, process the rule by applying any image operation(s) described in the rule and storing the result. If the rule object has child rules, each child rule may be processed recursively and stored or otherwise associated with the current screen image. If the rule object does not have child rules, recognition engine 525 may determine a rule type and perform an algorithm associated with the rule (and pass any algorithm-specific data).

If the algorithm indicates that there is a match, the recognition engine 525 may return the associated label of the matching rule, extract the application ID (and screen ID, if any), and send the application ID (and screen ID, if any) to the application manager 515. In some embodiments, recognition engine 525 may be configured to analyze an image using all available rules and pick a match based on the rule that returns the highest matching confidence score (as calculated in various appropriate ways).

If the algorithm indicates that there is no match (or that there is a match to a different application), the recognition engine 525 may notify the application manager 515. The application manager 515 may be configured to perform a hysteresis function and not assume based on one non-detection (or a limited number of non-detections) that the current application is unknown. Such an approach may help resolve errors in recognition and avoid a poor user experience, such as flickering when a given screen image is temporarily not recognized or mis-recognized.

The active source application screen (and/or other application output) may be captured by application capture element 505 and received by recognition engine 525 for analysis. In the case of capturing via an external display channel, the captured screen image may be received from connected resource 120 and passed to recognition engine 525 from projection engine 520.

Recognition engine 525 may be configured with matching models 580 (also referred to as "recognition" models) that may be downloaded from a server together with the application catalog 590 and/or other appropriate information. The recognition engine 525 may evaluate the models and report, to the application manager 515, the application ID, the screen ID of the detected application (or "null" if the current application is not known), and/or other relevant information.

Repository 530 may include memory or storage that may include matching models 580, launcher screens 585, an optional application catalog 590, and/or other appropriate elements. Each launcher screen 585 may be, or include, or otherwise implement an application screen that may be projected to the connected resource 570. The launcher screen 585 may include available applications (as indicated by the application catalog 590) and may allow an end-user to launch, or otherwise interact with, the available applications. The application catalog 590 may be a document or other data structure managed by a backend server or other appropriate resource that includes information such as a listing of applications should be accessible to an end-user via the screen projection system, associated restrictions (if any), screen recognition models (or references thereto), etc. Some embodiments may include an application management backend device (not shown) that may manage the application catalog 590, matching models 580, and/or other elements used by gateway 100.

Each matching model 580 may be represented by a file that stores a hierarchical object structure that describes ways to classify images. The hierarchical structure could be implemented using standard binary or text file formats such as protocol buffers, JSON, extensible markup language (XML), YAML, etc., or implemented as a proprietary serialized object structure. Each matching model 580 file may be compressed (e.g., using GZip) and/or encrypted. Such files may be digitally signed, such that the recognition engine 525 is able to verify the authenticity and integrity of each file when loaded.

One matching model 580 may be associated with, and used to identify, one or more applications. For each application, the matching model 580 may include and/or be used to recognize screens or states. Some matching models 580 may be used to recognize a screen mode across multiple applications (e.g., detection of the on-screen keyboard, regardless of the active source application).

Each matching model 580 may include a version and an optional digital signature that may use standard cryptographic APIs provided by the user device OS. The matching model 580 may include a rule element that may be the main hierarchical object that describes which algorithm to run and which parameters to use. The rule element may include one or more child rules.

The rule element may include various sub-elements, such as a type that may define the type of rule. Based on the type, various other properties may be different. Group rules may be used by some embodiments. Group rules may be able to perform certain common operations based on an input image and then pass the results to various child rules. Final rules may provide instructions regarding execution of one of the supported image classification algorithms.

Each rule may include a name element that may be used for debugging purposes. Each rule may include a priority element that may defines the priority of this rule in relation to the other rules or rule elements. The priority may be used by the recognition engine 525 to determine the order in which to evaluate the various rules. If no priority is specified, then the order in the model file and/or the order in which the models are loaded may be used to determine the priority.

Each rule may include a children element that includes a list of child rules, if any. The child rules may be evaluated in the listed order unless they are associated with a specifically defined priority.

Each rule may include an image operation element that may specify which operation(s) should be performed on an input image before the image is evaluated with respect to the rule and/or associated evaluation algorithm(s). Group rules may be associated with certain image operations that are applicable to all children rules in order to speed up the processing. Various image operations could be supported, such as scaling (e.g., the image could be scaled down or up to a predefined pixel size or by a relative percentage), cropping (e.g., a system bar may be cropped out using this operation), color conversion (e.g., convert to grayscale, convert to a different color space, remove bits from the color value, etc.), filtering (e.g., using operations such as dilate, erode, etc.), and/or other appropriate operations.

Each rule may include an image region of interest (ROI) element that may specify one or more ROIs for the input image that may be used by the recognition algorithm. The ROI may be specified as a rectangle, polygon, mask, and/or other appropriate ways.

Each rule may include a label. For rules that define classification operations, the label field may include the result that should be returned by the recognition engine 525 if the rule is matched. In addition, algorithm-specific data may include label data. The label may be represented as a string that includes information such as an application ID and/or a screen ID.

Each rule may include an algorithm-specific data element that may, depending on the type of rule, stores parameters that are passed to the corresponding image classification algorithm.

Development kit 555 (also referred to as a "notifications" software development kit (SDK)) may enable notification messages between gateway 100 and source application 545. Source applications that integrate with development kit 555 may be able to provide enhanced user experiences.

Projection client 570 may receive and playback the projection information stream sent by projection engine 520. The projection client 570 may display the result to the appropriate display or screen of the connected resource 120. The projection client 570 may capture any user inputs (buttons, touch, voice, etc.) and send the captured user input to gateway 100.

User device interfaces 575 may allow for control of user device 110 outside of the projection engine 520 to projection client 570 communication path. For example, user device interface 575 may include or utilize a human input device (HID) and application control element 510 may direct the user device interface 575 to send HID commands to the user device 110.

User device 110 and connected resource 120 (and/or other system or environment elements described herein) may communicate across various paths or channels. For instance, a main data channel between user device 110 and connected resource 120 may utilize connectivity technologies such as Wi-Fi, Bluetooth, universal serial bus (USB), etc. and may use communication protocols supported by typical user devices 110, such as Android open accessory (AOA), external accessory protocol (EAP), transport control protocol over Internet protocol (TCP/IP), etc. Some embodiments may include communication channels such as an external control channel, an external display channel, an audio channel, etc.

The external control channel may include, for instance, HID inputs sent over USB or Bluetooth, a location device input, etc. The external display channel may utilize or provide projection utilities such as AirPlay, MiraCast, HDMI, MHL, ChromeCast, etc., where data may be sent over a wireless or wired channel. The audio channel may include or provide audio-in and/or audio-out data over channels such as Bluetooth advanced audio distribution profile (AADP or "A2DP"), USB audio, USB mic, AirPlay, WiSA (wireless speakers and audio), digital living network alliance (DLNA), high-definition multimedia interface (HDMI), etc.

The user device 110 and connected resource 120 may communicate via such a main data channel (and/or other available channels) using a data channel communication protocol (DCCP) of some embodiments. Messages sent between gateway 110 and projection client 570 (and/or other system elements) may utilize or implement such a DCCP. The messages may be stored and transmitted using binary, text, and/or other appropriate representations. For example, the DCCP of some embodiments may utilize serialized "C" structures, string formats such as JavaScript object notification (JSON), protocol buffers, etc. Use of protocol buffers may be preferred, as the binary format is extensible and efficient in terms of bandwidth and processing.

Although various messages or other elements of the DCCP may be described by reference to specific parties, one of ordinary skill in the art will recognize that the same, similar, and/or complementary messages or elements may be implemented using various other parties.

Regardless of the underlying message format, messages (and/or associated protocol(s)) may be extensible such that new messages may be added to the communication protocol(s). Older versions of gateway 100 or projection client 570 may ignore such new messages. The messages and/or protocol(s) may be backward-compatible such that newer components may be able to interact with older components by sending messages that are compatible with such older or legacy components. The messages and/or protocol(s) may be forward-compatible such that, for instance, new fields added to messages will be ignored by older components and utilize only recognized fields.

Some such messages may follow a request and response format or paradigm, such that a request sent by one element receives a response from another element. Such messages may share a common request identifier, or other appropriate attributes, that may allow a request to be associated with a corresponding response. Each message described above and below may be divided into multiple, smaller messages. Likewise, each message may be combined with other messages into a larger message.

In some cases, multiple data paths between user device 110 and connected resource 120 may be available. For example, a Bluetooth connection may be used initially, then a Wi-Fi connection may be established, and/or a physical connection such as a USB cable may be added. The DCCP may support such multi-channel arrangements using session information.

For example, the DCCP may include a "session" message used to establish an initial connection over a first channel (e.g., Bluetooth). This session message may allow endpoints to establish a continuous session throughout one or more connection channels. The message may be used to determine whether a newly established connection (or "channel") is to the same device as an existing or last known connection. Such an approach allows peers to perform seamless switching between connection channels. Session messages be used to establish a new session and disconnect all other communication channels of non-matching devices.

Each session message may include a session token of the component sending the message and various session handshake flags. Such session handshake flags may include an announcement flag indicating whether the message is an announcement (meaning that a new session is not requested), a new session flag indicating whether the message is requesting a new session is to be established, a response flag indicating whether the message is a request or response message, and/or other appropriate flags. Session request messages may be sent by the projection client 570 and session response messages may be sent by the gateway 100.

As part of the initial setup, session tokens may be exchanged and stored by gateway 100 and/or projection client 570. If a second channel is established, the gateway 100 and projection client 570 may attempt to continue an existing session. If successful, the second channel may be used in parallel to, or instead of, the first channel.

Such an approach allows seamless transition between channels to accommodate changes in connectivity (e.g., due to user actions or selections, determinations based on signal strength or other metrics, etc.). Parallel channels may be used for different purposes. For example, a lower-throughput Bluetooth channel may be configured to use a lower bitrate associated with a lower quality video streaming format. If a higher throughput channel becomes available, the video streaming may switch to the higher throughput channel and associated higher quality data video streaming format.

To implement such multi-channel session-based communications, gateway 100 and projection client 570 may utilize sets of session tokens. Such session tokens may include a client session token that may be generated by projection client 570 and sent to gateway 100 and a gateway session token that may be generated by gateway 100 and sent to projection client 570.

The session tokens may be generated using a random number generator, and attributes (e.g., date, time, etc.), connectivity channel identification information (e.g., IP address, media access control (MAC) address, etc.), and/or other appropriate information.

Session tokens may be exchanged in various appropriate ways. For instance, projection client 570 may, upon connecting to gateway 100, send a session message including a previously stored (if available) or newly generated client session token, raised announcement flag, and/or other appropriate content.

Gateway 100 may receive the session message from projection client 570 and compare the received client session token to any active or other previously received client session tokens. If the received client session token matches an active or previously received client session token, gateway 100 may send a session reply message including a gateway session token, raised announcement and/or response flags, and/or other appropriate content. Gateway 100 may generate and store a gateway session token if the corresponding stored session token is empty.

If the received client session token does not match an active session token, thus indicating a new connection, gateway 100 may determine whether there was a previously active connection (e.g., if a previously received session token matches the received client session token). If a previously active or currently active connection is identified, gateway 100 may stop the previous connection and switch to the newly available connection, where such switching may be based on some specified criteria (e.g., gateway configuration, user confirmation, etc.). If a newly available connection is rejected (e.g., a user selects an option to continue on a previous connection), gateway 100 may send a new session message with an empty session token, raised response flag (e.g., indicating the new connection was rejected), and/or other content. If a newly available connection is accepted, gateway 100 may clear any stored active client session token, generate a new gateway session token, and send a session response message including the new gateway session token, raised new session and response flags, and/or other content.

Projection client 570 may receive the session response message. If the new session flag is raised, projection client 570 may disconnect all other channels or devices until only the current channel is open, store the received session token as a new gateway session token, clear any stored client session token, generate and store a new client session token, and, if the response flag is not set, send out a new session message with the new session flag raised and passing the newly generated session token. If the new session flag is not raised, but the announcement flag is raised, projection client 570 may check the received gateway session token and compare it to the stored gateway session token. If the tokens do not match, projection client 570 may proceed as if the new session flag were raised. If the tokens match, no additional action may be taken as the new channel is to an existing device.

If gateway 100 receives a session message with a new session flag raised and there is a previously active connection, depending on the configuration of gateway 100, the gateway 100 may switch to the new connection or ask for confirmation to end the previous connection. If the new connection is rejected, gateway 100 may send a new session message with an empty session token and response flags raised, indicating the new connection is rejected. If the new connection is accepted, gateway 100 may disconnect any existing connections, store the received token as a client session token, generate and store a new gateway session token, and send the new token via a session message with the new session and response flags raised.

Unless gateway 100 and/or connected device 120 establish a session by completing one or more message exchanges as described above, any other messages are ignored.

As another example, the DCCP may include an "identity" message. Such a message may be sent by any element to request the identity of another element. Some of the information sent via an identity message might be sensitive and need to be send over a secure channel. The identity message may be initiated by any party at any time once a connection between peers has been established (e.g., by exchanging session tokens as described above). One party may request the identity of the other party by sending an empty identity message or a special parameter or flag indicating that the identity is requested. The recipient of the identity request may respond with the same identity message type having populated identity values. The identity request may specify the minimum required identity values that should be returned. If the peer device does not respond within some specified time limit from the request (e.g., five seconds), the identity information is not complete, or does not match, the requestor may drop the connection.

The identity message may include an identity value list that includes identity IDs and corresponding values. Examples of identity IDs include a system ID, display names, manufacturer, model (any string that describes the device), country codes, serial number, OS information, application information, and/or other identifiers. The system ID may be a single string that uniquely identifies the peer device. If the same device is already connected (with the same software running) the device will always return the same system ID. System ID may typically include, or be generated using, model, make, obfuscated serial number, and/or a random number generated by the device. Display name may be a name of the peer device that may be presented to a user. The string may be in English. In some cases, the device may send the display names in other languages via additional identity IDs. Each country code may be a string including one or more comma separated ISO 3166-1 alpha-2 codes that represent the country or countries for which the peer device is configured for. The serial number may be a unique string that identifies the device. If the message is passed over a non-secure connection, the serial number may a pseudo serial number (e.g., a number generated on the device or an obfuscated serial number). OS information may include the name and version of the operating system. Application information may include information about the main application running on the device, such as the name of the application, vendor, version, etc. Other identification values may be utilized as needed.

Another example of a DCCP message is a "ping" message. Such a message may allow endpoints to determine whether a peer application is responsive. The ping message may be used to determine whether a connection is still active for transports that do not correctly report when a connection is lost. The ping message may also be sent from projection client 570 at regular intervals in order to keep a connection alive while the application is running in the background.

The ping message may include a request ID that identifies the message, where a response ping message should include the matching request ID. The ping message may include various flags, such as a request flag indicating whether a response is required (for a request message), a response flag indicating that the message is a response to a previously sent request, and a one-way flag indicating that no response is required or expected.

The DCCP may include a "sync time" message that is used to synchronize gateway 100 and projection client 570. The sync time message may be used to calculate the offset between the local clock and the clock of the remote peer. Different clock synchronization strategies may be used. The simplest algorithm is to have a peer send the sync time message with the current timestamp of the peer. A remote peer may respond with the current timestamp of the remote peer. The sending peer may then calculate the offset by subtracting the two timestamps and taking into account the latency of the communication link.

The sync time message may include a request ID that identifies the message, where a response sync time message should include the same ID. The sync time message may include a client timestamp (e.g., a timestamp in milliseconds or microseconds indicating when the message was sent from the client) and a gateway timestamp (e.g., a timestamp in milliseconds or microseconds indicating when the message was sent from the gateway host).

Another example DCCP message is a "connected device state" message used by the projection client 570 to report status and any mode changes to the gateway 100. For example, if connected resource 120 is an in-vehicle device, the connected resource 120 may report current driving status to restrict any driver distraction. The message may be sent unsolicited by the client 570.

The connected device state message may include a restriction level indicating the current restriction level reported by the device, a display status indicating whether the connected device is displaying any content received from gateway 100, and/or other appropriate status fields or other content.

Figure 6:
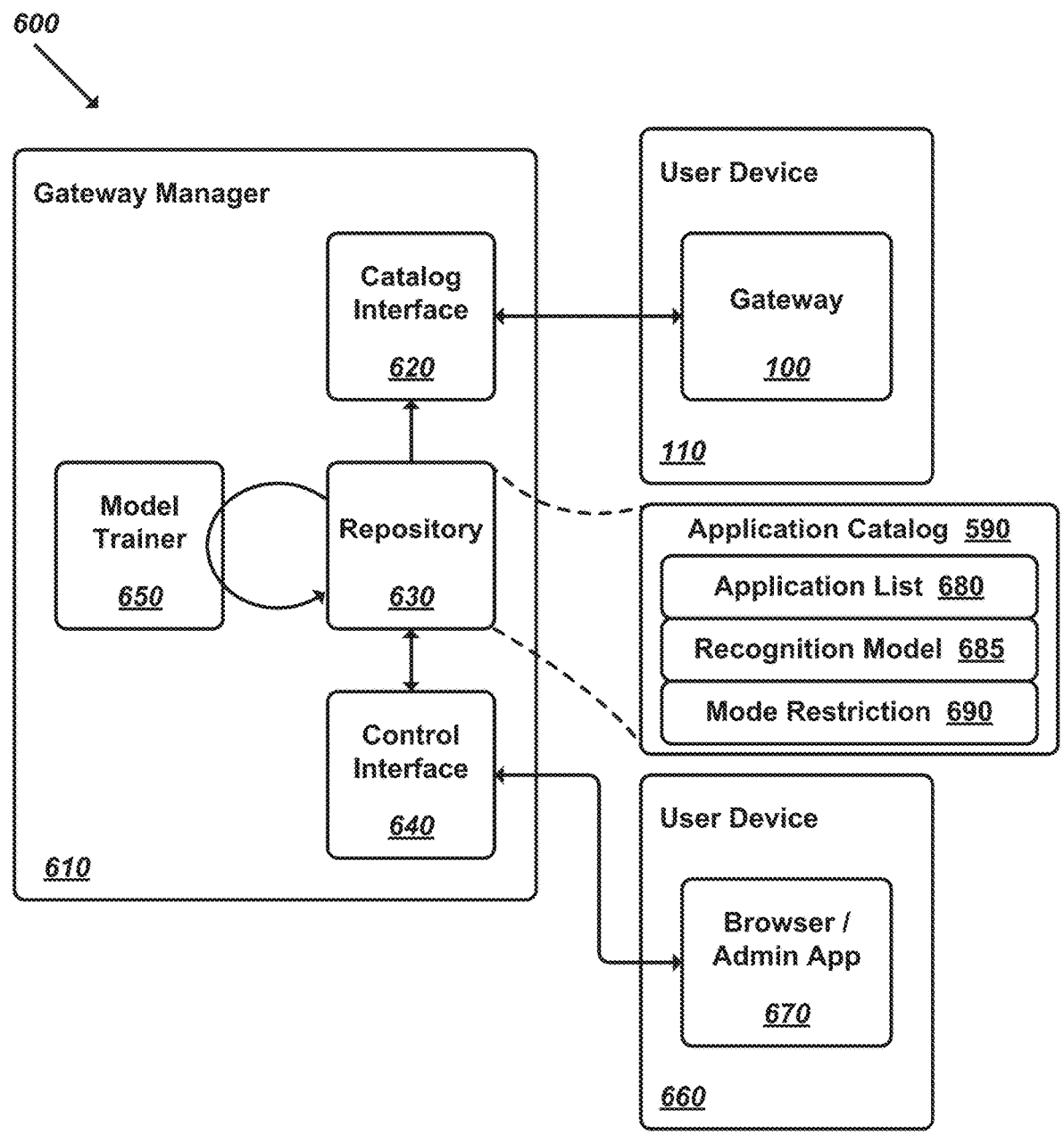
FIG. 6 illustrates another example environment in which one or more embodiments, described herein, may be implemented.

FIG. 6 illustrates another example environment 600 in which one or more embodiments, described herein, may be implemented. As shown, environment 600 may include user device 110 described above and a gateway manager 610 including a catalog interface 620, a repository 630, a control interface 640, and a model trainer 650. Environment 600 may further include user device 660.

Gateway manager 610 may include one or more electronic devices such as a server or cluster of servers and may be accessible via a public cloud, private infrastructure, and/or other appropriate resources.

Catalog interface 620 may include an API or other appropriate resource that may allow gateway 100 to request application catalog 590 and/or other appropriate information. The API may utilize a representational state transfer (REST) architecture using hypertext transfer protocol (HTTP) requests, or other web service APIs such as Google remote procedure calls (gRPC), simple object access protocol (SOAP), Java remote method invocation (RMI), etc. The API may be executed over a secure connection such as transport layer security (TLS). The API may support authentication (e.g., a way for the gateway 100 to authenticate with the gateway manager 610) and requests for the application catalog (returning a response matching a connected resource ID).

The specific application catalog 590 that is returned may depend on the connected resource 120. User device 110 may be connected to different connected resources 120 having different capabilities. Similarly, different applications may be available for different geographic regions or business considerations may determine which applications should be included or enabled. For example, a provider of a connected resource 120 may license a set of application to be enabled by default. Device information included in an identity message sent by connected resource 120 may be utilized by gateway 100 when requesting or providing the application catalog 590. The application catalog 590 may be extracted or built at runtime using data received from repository 630.

Repository 630 may include a database management system (DBMS) that stores the various application catalog records, which allow the catalog interface 620 to quickly extract or build the desired application catalog 590. The database used by repository 630 may be a relational database (e.g., structured query language (SQL) Server, MySQL, Postgres, etc.) or non-relational database (e.g., Dynamo DB, Mongo DB, Simple DB, etc.).

The application catalog 590 may be a data structure that describes which source applications should be managed by gateway 100. The application catalog may be provided in different formats. For example, when requested from the gateway manager 610 via the catalog interface 620 the catalog may be returned in a portable format such as JSON, proto buffers, etc. When being processed by gateway 100 the application catalog 590 may be represented as a hierarchy of object references. Regardless of the exchange, storage or processing format, the application catalog 590 may include various attributes or parameters. Example parameters may include a version and a set of connected resource identifiers for which the application catalog 590 applies.

The application catalog 590 may include an application list 680 of application records. Such records may be associated with various fields, including examples of such fields described below. An application ID field may include a unique identifier for the application. The ID could be any string, but to avoid name collisions, it is recommended to use reverse uniform resource locator (URL) notation, such as "com.yelp". A projection type field may describe the type of projection supported by the application (e.g., captured application, projected application integrated with SDK, web application, etc.). In some embodiments, a special type of application record marked as "data-only" may be supported. Such records may be used to store common information such as matching models for system screens such as keyboards and may not be associated with a specific application.

An application category field may indicate the type of application (e.g., the main function of the application). The category may include multiple levels (e.g., primary, secondary, etc.). The category may be represented via a string with sub-categories separated by a forward slash (similar to a directory path), where the more generic category is first, followed by the more specific, etc. If the application supports multiple categories, the categories may be separated using commas. For example, for a navigation application the category could be "mapping/navigation", while for a video player application the category may be represented as "media/video", a music player as "media/music", an application that supports video and music may be represented as "media/music,video".

An installation location field may provide a location (e.g., a URL) from which the associated application may be installed. There may be different sub-fields included in the installation location field for various supported user device platforms. For example, for iOS the installation location field may point to the location of the application on the App Store.

A display information field may include information regarding how the application may be presented to the end-user. The display information field may include elements such as a title (localized for the supported languages), icons (e.g., for the different supported resolutions), description (localized for the supported languages), etc. The display information field may include display options, such as whether the application icon should be initially shown in a launcher screen, whether the application should be shown to or hidden from gateway 100, etc.

A launch information field may include information regarding how the associated application may be launched by the gateway 100. There may be different sub-fields for the supported user device platforms. For example, for iOS the launch information field may include a URL-schema to launch the application, while for Android the launch information field may include a launch intent or package name.

An authentication information field may include information that allows the gateway 100 to verify and authenticate that the application installed on the user device 110 is the correct one. There may be different authentication records for the various supported platforms as well as for the different versions of the application. There may be different ways for gateway 100 to obtain application signatures or certificates. For example, on Android a PackageManager.getPackageInfo API and GET SIGNING CERTIFICATES flag may be used to obtain such resources. As another example, the application may be verified via a checksum where the gateway 100 may calculate a checksum of a predefined binary of the target application and compare it with the value from the authentication information field. On some user device systems, the gateway 100 may be restricted from accessing third-party application information, in which case the record for the authentication information field for that platform might be empty and the gateway 100 will recognize that the given application cannot be authenticated.

A recognition model field 685 may store application and screen recognition models (and/or references thereto) for the different platforms and supported application versions.

An application purchase information field may store information to enable applications and/or functionality through in-app purchases. If existing in-app purchase frameworks are used such as StoreKit or Google Play billing, the application purchase information field may include product IDs and have the pricing information be managed through corresponding back-end systems. In some embodiments, the application purchase information field may store product prices (e.g., for the different supported regions) and any information necessary to complete a purchase.

An application mode restriction field 690 may be an optional record that describes whether any restrictions should be applied to the projection of the current application depending on an operating mode of the connected resource 120.

A signature field may be a digital signature of the application catalog that may be used to validate the integrity of the catalog information. A file including the application catalog may be signed with a private key stored securely on the gateway manager 610 and validated by the gateway 100 via a public key. The signature field allows a catalog to be stored at a user device 110 and, when reading the catalog later, the gateway 100 may verify that the catalog has not been modified. If the catalog has been modified, the gateway 100 may reject the catalog and request a new catalog from the gateway manager 610.

The application catalog 590 may include various other fields, elements, attributes, parameters, or other data, as appropriate.

Control interface 640 may include or provide an application management API or other appropriate resources that allows application catalog records to be created, modified, deleted, and/or otherwise managed. Such an application management API may utilize a REST architecture having HTTP requests or other web service APIs such as gRPC, SOAP, Java RMI, etc. The application management API may be executed over a secure connection such as TLS. The application management API may allow for authentication, management of connected devices, creation or deletion or application catalogs, management of application catalog entries, and/or other interactions with application catalog 590.

User device 660 may be a device such as user device 110 that is associated with an administrator rather than an end user. User device 660 may include or execute a web portal (via a browser) or administrative application 670 that provides access to control interface 640. Administrative application or web portal 670 may be restricted to access via virtual private network (VPN) for added security.

User device 660 and/or administrative application or browser 670 may authenticate with the gateway manager 610 and be provided different access rights. Based on the authentication, some functionality of the control interface 640 may be enabled or disabled.

Administrative application 670 may manage connected resource identities, allowing for connected resource IDs to be created, deleted, modified, etc. Administrative application 670 may be able to create and/or delete application catalogs and/or manage application catalog entries by adding, removing, and/or modifying information associated with the application catalog entries.

Model trainer 650 may generate and/or train recognition models 665 and/or other models used by, or implemented by, gateway manager 610 or gateway 100. Model training will be described in detail in reference to process 1100 below.

Figure 7:
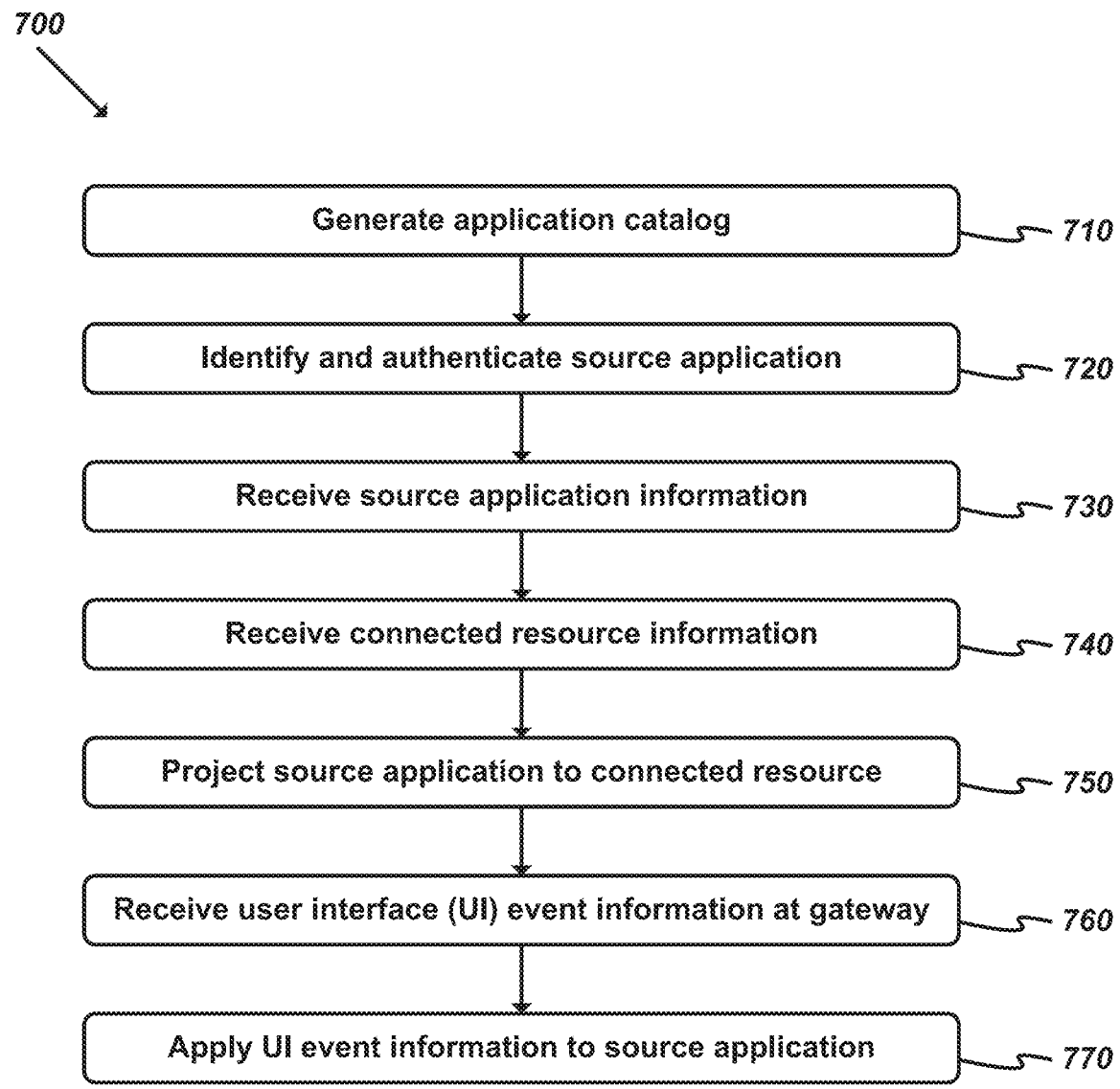
FIG. 7 illustrates a flow chart of an exemplary process for projecting application content from a user device to a connected resource.

FIG. 7 illustrates an example process 700 for projecting application content from a user device 110 to a connected resource 120. Process 700 may allow a user to expand or enhance the capabilities of a connected resource 120 using connectivity and/or processing power provided by a user device 110. The process may be performed when a source application is launched, at regular intervals, and/or based on some execution criteria. In some embodiments, process 700 may be performed by gateway 100. Components such as projection client 570, catalog interface 0620, and/or control interface 640) may perform complementary processes to process 700.

As shown, process 700 may include generating (at 710) an application catalog, such as or similar to application catalog 590. The application catalog may be received by gateway 100 from a resource such as gateway manager 610 via catalog interface 620. Gateway 100 may build the application catalog based on data received from a resource such as gateway manager 610 via catalog interface 620. If available, gateway 100 may retrieve a previously generated or received application catalog from a resource such as repository 530. Any newly received or newly generated application catalog may be stored at gateway 100 (e.g., using repository 530) for future use.

Projection client 570 may send an "application catalog" request message to request the latest application catalog or register for application catalog updates. The application catalog request message may include elements such as a request ID. The gateway 100 may return the same request ID with an application catalog response message such that the projection client 570 may match the requests with the responses. If the Gateway 100 sends an update message, the request ID may be set to zero. The application catalog request message may include various application catalog flags that may indicate how the application catalog should be processed. The projection client 570 may set the requested flags. The gateway 100 may return the current gateway flag values. Application catalog flags may include an "auto update" flag that indicates whether the host should send "application catalog" messages automatically every time there is a change to the application catalog. When sent by the projection client 570, the auto update flag may request that the gateway 100 provide auto updates. To stop auto updates, the "stop auto update" flag may be set by projection client 570. When sent by the gateway 100, the stop auto update flag may include the current auto update status of the gateway 100. The application catalog flags may include a "full catalog" flag that may indicate whether the gateway 100 should return the full application catalog. The full catalog flag may be returned by the gateway 100. If the full catalog flag is received, the projection client 570 should update the entire internal catalog (adding and removing applications). If the full catalog flag is set by the projection client 570, the flag may be ignored.

The application catalog request message may include one or more application records. Each application record may include a paired property ID and associated value. When requesting an application catalog, the projection client 570 may populate one application record with IDs of the needed properties and possible required and/or filter values. Example property IDs and associated values are shown in Table 1 below. In response to the application catalog request message, gateway 100 may return a list of application records, with the requested properties for each application and the associated values.

As described above, application properties may be specified using predefined name/value pairs included in an application catalog message (and/or other application catalog resource). The names may be predefined and assigned a value as indicated in Table 1 below.

TABLE 1

| Name | Value | Description |
| --- | --- | --- |
| Ignore | 0 | Property that may be ignored by the receiving side. May be used for debugging purposes or as a comment. |
| application ID | 1 | A string that defines the application ID. The same ID may be used as part of a current application message and may remain constant across multiple connectivity sessions. If a value is specified as part of the application catalog request message, then the Gateway 100 may return information only about the specified application. This may be useful for implementations that are interested in updating the status for only one specific application. |
| display name | 2 | Name of the application to be displayed to the user. May be returned in the language specified by the display name language field. |
| display name language | 3 | (Optional) May specify the language of the display name. May follow the language code format. If not specified, English ("en") may be |

TABLE 1-continued

| Name | Value | Description |
|---|---|---|
| | | assumed. As part of the application catalog request message, the projection client 570 may use this property to request a desired language. The gateway 100 may return the requested language (if available), otherwise the default language (English) may be returned. |
| category | 4 | A string that may specify the application category as defined by the application catalog. |
| image width | 5 | The width (e.g., in pixels) of the returned application image. As part of the application catalog request, the projection client 570 may use this property to request a desired image width. The gateway 100 may return the image in the requested size (or the closest available). |
| image height | 6 | The height (e.g., in pixels) of the returned application image. As part of the application catalog request, the projection client 570 may use this property to request a desired image width. The gateway 100 may return the image in the requested size (or the closest available). |
| application image | 7 | May include the binary content of the application image in the supported format. The image may have the dimensions specified in the image width and image height properties. |
| application status | 8 | May specify the status of the application. The following values may be associated with the application status field:<br>0 - Unknown (reserved)<br>1 - Installed—the application is installed and enabled by the user<br>2 - Not Installed—the application is not installed on the user device 110<br>3 - Disabled—the application is installed, but the user has disabled the application from the gateway 100. Typically, if this flag is set, it means that the user does not want to see a shortcut to the specific application (either in the home screen or direct launch).<br>4 - Hidden—the application is hidden from the launcher screen. This could either be done from the gateway manager 610 or from the gateway 100. If the application is hidden from the home screen the application may still be available for direct launch. |
| application record flags | 9 | May specify additional flags that define how the application should be presented to the user. Examples of support flags include:<br>Favorite—a flag indicating whether the current application is marked as favorite by the user.<br>InAppPurchase—flag indicating that the application provides additional content for purchase. |
| image signature | 10 | A byte sequence that may identify the application image content. The projection client 570 may use this information to determine if the image has changed and whether the image should be downloaded again. The signature may be calculated using MD5 checksum or some other algorithm. |
| reserved | 11-1024 | Reserved for future use. |

The application catalog may be provided to other resources, such as projection client 570, via an application catalog message. Such a message may be initiated by projection client 570 and received by gateway 100. The application catalog messages may follow a request and response format. In some cases, gateway 100 may send automatic updates to the projection client 570. Various application catalog message flags may be used to define or modify the messaging procedure (e.g., an auto update or stop auto update flag may be set to manage automatic update messages).

Projection client 570 may request, in an application catalog message, data associated with one or more applications (up to the entire application catalog) from an application catalog associated with gateway 100. Applications may be requested using an application ID in an application catalog request message, if available at the projection client 570. If no application ID is specified, all available applications may be returned and a full catalog flag may be set. The projection client 570 may indicate one or more specific application properties to be returned in a response to an application catalog request message.

Projection client 570 may request specific application attributes (e.g., image width, image height, display name language, etc.) in an application catalog message. If no application attributes are specified, then gateway 100 may return all available application properties.

The application catalog messages may typically follow a request and response format. However, the projection client 570 may request to be notified whenever there is a change in the application catalog. For example, an application status may change or a new application may be added to the application catalog. Such notifications may be supported via the auto update flag and stop auto update flag associated with the application catalog message. If the auto update flag is raised in an application catalog request message from the projection client 570, the gateway 100 may send an application catalog message every time there is a change in the application catalog. As part of such a request message, the projection client 570 may specify which application properties should be included with each update, by populating an application record. If no application record is populated, then all properties may be returned with each update. The projection client 570 may stop automatic updates by sending an application catalog message with stop auto update flag set.

Process 700 may include identifying and authenticating (at 720) a source application. Such identification and authentication may be performed in various ways, depending on which resource launches the application and/or other relevant information. For instance, an application may be launched at a user device 110 and a request to project the application may be received at gateway 100. As another example, projection client 570 may send a request to launch an application.

Third-party source applications may be launched via gateway 100. A launch request may be received via a resource such as the launcher screen or a message received from the connected resource 120. Source applications that are available to be launched may be stored in the application catalog and launch information may be provided in a launch information record. Application launching may be performed using APIs or other resources provided by user device 110 and/or other system elements. For example, for iOS the gateway 100 may launch an application using URL-schema. For Android, the gateway 100 may use a launch intent with the desired application package name to launch an application. Application launching may be performed by a resource such as application control module 510.

In some situations, it may be useful for the projection client 570 to be aware of the available applications and the active application. For example, the projection client 570 may select a specific application to be launched. Such awareness may allow for user experiences as if projected applications are natively running on the connected resource 120.

For example, a connected resource 120 associated with an automotive system may include a hardware button on the in-vehicle head-unit that launches a navigation application. A projection client 570 running at the connected resource 120 may query the gateway 100 for the available applications from the application catalog 590 and request that a navigation application be launched at the user device 110 by gateway 100.

The projection client 570 may receive a list of the available applications and their status using the application catalog message as described above. The projection client 570 may use the list information to display a set of application icons or notify the user as to the applications available via gateway 100.

The DCCP may include a "current application" message that may be used by gateway 100 to notify the projection client 570 whenever the active application changes. The active application may change based on user switching or a projection client 570 directed switch. The projection client 570 may use the current application message to request to launch a specific application. The current application message may include an application ID element that uniquely identifies the application. The application ID may be stored in the application catalog 590. The current application message may include an application status element that defines the status of the application (e.g., "launch"—requesting the application be launched, "activated"—indicating the application has been activated, "launching"—indicating the system is in a process of launching the specified application, and/or "launching failed"—indicating that the requested application launch has failed). When launched successful, "activated" status may be returned in a response to the current application message. The current application message may include an application screen ID element that identifies the ID of the active screen of the current source application (if detected).

The projection client 570 may utilize the current application message to request that a given application supported by the application catalog be launched. The message may be handled by the gateway 100 and redirected to a resource such as application manager 515, which in turn may resolve the application ID to an entry in the application catalog. Application manager 515 may provide the application entry information to the application control module 510, which may try to launch (or switch to) the requested application on user device 110. If the requested application is not installed, the gateway 100 may show an appropriate message and/or instruct the user to install the application. The gateway 100 may return a status flag via a current application response message.

Any time the currently projected active application changes, the gateway 100 may send a current application message with the appropriate status. If supported, the gateway 100 may also send a notification every time there is a change in the active mode and/or screen. The projection client 570 may use the notification message to update the status of UI elements associated with the active applications.

Once an application is launched there could be cases were the gateway 100 should restrict what applications are projected to the connected resource 120. For example, for in-vehicle systems there could be driving distraction regulations that prohibit certain applications to be displayed on the in-vehicle display while the vehicle is moving. Thus, gateway 100 must be able to detect the identity of the active application that is being projected to the connected device. Various detection algorithms (or combinations thereof) may be used to identify the active application, depending on the capabilities of user device 110, access provided to gateway 100, and/or other relevant factors.

If user device 110 provides a system API, such as OS interface 560, or another such resource to the gateway 100, the active application may be reported over the interface. The gateway 100 may use the application catalog to match the information reported by the system API to an application ID associated with an entry in the application catalog. For Android, the accessibility service API may be used to detect the package name of the current application. The gateway 100 may then use the application catalog to match the package name to a supported application entry from the catalog.

As some user device operating systems might not provide an API or other such resource to detect the active application, a lightweight notification SDK, such as development kit 555, may be integrated with the source application in order to provide notifications to the gateway 100. The notifications development kit 555 may communicates with the application control module 510. The application control module 510 may, in turn, notify the application manager 515 whenever the captured application changes state (e.g., moves to the background or foreground, is started, closed, etc.).

The notification development kit 555 may communicate with the application control module 510 in various ways, such as HTTP messages sent over a socket connection, binary or simple JSON socket messages, inter-process messaging APIs available on the user device 110, and/or other appropriate ways.

The notification development kit 555 may support messages such as authentication messages. Such sets of messages may be used to authenticate the source application (e.g., source application 550) to the gateway 100 and vice versa. Both parties may exchange public certificates, which may be signed by the gateway manager 610. The peers may verify the package signatures using system APIs (if available). If both parties are authenticated, the peers may exchange session keys to be used for additional messaging or other communications.

The notification development kit 555 may support messages such as an application status change message. Such a message may be sent by the source application whenever the application status changes (e.g., moves to the foreground, goes to the background, is opened, is closed, etc.). A similar message may be sent by the application control module 510 when projection is started and/or stopped for the current source application. Such a message may be used by the source application to update a UI associated with the source application.

The notification development kit 555 may support messages such as a screen status change message. Such sets of messages may be sent by the source application whenever the current screen or status has changed. For example, if a user activates an edit field, a keyboard may be displayed. The screen status change message may be used to handle special restrictions based on application mode.

Process 700 may include receiving (at 730) source application information. Such information may be received from a resource such as repository 530, based on an identified application ID and/or screen ID. Such source information may include, for instance, permissions associated with a source application, user information (e.g., username and password), configuration information (e.g., user selections or preferences, manufacturer default values, etc.), and/or other appropriate information (e.g., output data format(s), lists of UI features, etc.).

As shown, process 700 may include receiving (at 740) connected resource information. Such information may be requested and received from the connected resource 120 in some embodiments. Connected resource information may be extracted from the application catalog 590 and/or related data elements.

In some embodiments, sensor data (and/or other types of data) may be received from (or via) the connected resource 120. Such sensor data may include, for instance, data received and/or derived from GPS components, accelerometers, gyroscopes, microphones, temperature sensors or other environmental sensors, etc. Such data may be sent over any available channel between gateway 100 and connected resource 120.

Such sensor (and/or other) data may be configured in various appropriate ways. For instance, projection client 570 may send an "input capabilities" message to gateway 100 that indicates any supported sensors or other data sources. Gateway 100 may configure the desired input device(s) by sending a "configure input" message that may specify the device type, protocol, and/or other relevant information. Projection client 570 may respond with a configure input reply message that may include or indicate device IDs for the input data sources that are accepted or applied. Gateway 100 may request streaming of input data from a given input device by sending a "control input" message that indicates the ID of the desired device and the frequency of data sampling and/or transmission. Gateway 100 may receive the data from projection client 570 (and/or other components of connected resource 120) and provide (or inject) the data into the user device OS or the source application, as appropriate.

The sensor (and/or other) data may be sent via an external data input or other connection, if available. Many user devices 110 and/or connected resources 120 may support transfer of external sensor data via a standard interface. For example, iOS provides GPS data via the iAP accessory protocol. Android allows location (if mock location is enabled) through a standard National Marine Electronics Association (NMEA) compatible device (e.g., via Bluetooth or serial data bus). Various other external sensor data inputs may be supported by gateway 100.

The projection client 570 may send such data over the main data channel using a "send input event" message (and/or other appropriate messages). Sensor (and/or other) data may be collected by the projection client 570 and sent to gateway 100 via a set of "send input event" messages. Multiple data sources may send data at the same time. Multiple data records (from the same or different sources) may be combined into a single message. Gateway 100 may inject or otherwise provide the received data to the source application 545 or OS interface 560. Depending on the type of data, the gateway 100 may simulate or emulate the data as an input via the OS interface 560 (e.g., using various system APIs). For example, for Android, GPS location may be simulated through a "mock location provider" with an "ACCESS_MOCK_LOCATION" permission. For other input data types, gateway 100 may invoke various APIs of the source application 545, if available.

Process 700 may include projecting (at 750) the source application to the connected resource 120. Gateway 100 may efficiently, and with low latency, capture the current screen of the active source application 545 on the connected user device 110. Various approaches may be used to capture screens (and/or other output data including content and/or commands) and project the captured data to the connected resource 120 via projection client 570 and/or other appropriate resources.

For example, various display technologies such as screen mirroring may be used. Some user devices 110 and associated operating systems may support such external display capabilities. For example, AirPlay, MiraCast, ChromeCast, high-definition multimedia interface (HDMI), mobile high definition (MHL), and/or other appropriate features may be used to project screen images. In this mode, the gateway 100 may not capture the active screen. Instead, the projection client 570 may use one of the external display modes supported by the user device 110 and receive the current screen images through, for example, an external display channel of the user device interface 575. The projection client 570 may then display the received content at the connected resource 120.

Such "standard" display modes may not provide functionality required for additional processing of captured screen data or other content. For instance, application identification or functionality restriction may require that captured data be supplied to various components of gateway 100, such as recognition engine 525 or application control module 510. Thus, in some embodiments the projection client 570 may send the content such as images received over an external channel to the projection engine 520 and/or other components for analysis. This way, the more powerful and capable user device 110 may perform any additional processing, allowing the connected resource 120 to operate with more simple requirements and reduced hardware capability.

Such "extended" standard display modes may be initiated, after establishing a connection between gateway 100 and projection client 570, by sending a "display capabilities" message from the projection client 570 to gateway 100. In some embodiments, such display capability information may be retrieved from a resource such as repository 530 (and/or otherwise retrieved or determined).

The gateway 100 may send a "display request" message to the projection client 570 to request use of a supported external display channel. The projection client 570 may attempt to open an external display channel to the user device 110 (e.g., via user device interface 575) and may respond with a "display response" message indicating a connection status.

The projection client 570 may send a "display request" message to the gateway 100 to request that the gateway 100 assist in starting an external display mode on the user device 110. In some cases, the user device 110 may provide an API (and/or other appropriate resource) to start the external display mode. For example, ChromeCast may be started via a "MediaRouteSelector" feature. On devices that do not provide such a resource, the gateway 100 may provide instructions to the user and/or launch a system settings menu in order for the user to complete the configuration and connection steps. The gateway 100 may respond with "display response" message Once the projection client 570 establishes a connection to an external display, the projection client 570 may notify the projection engine 520 via an "on external display status changed" message. The projection engine 520 may send a request the projection client 570 to send screen images, for example via a "capture display request" message. The projection engine 520 may request to pause or resume streaming of the captured images via a "capture display request" message and/or otherwise direct the streaming of data via the external channel.

Projection engine 520 may send additional overlay video stream(s) or image(s) to be displayed by the projection client 570 on top of (or otherwise combined with) the video (and/or other data) stream coming through the external display channel. The additional video or image information may be associated with, for example, location, size, and transparency information that instructs how and where the projection client 570 should display the overlays.

Such overlay information may be used for application or content blocking in some embodiments. Gateway 100 may perform application blocking of the content send via the external display channel. Such application blocking may include, determining (e.g., based on the active application identity and any associated rules from the application catalog), gateway 100 may request (e.g., via projection engine 520) that screen projection be stopped or resumed. Based on the specific external display technology used, the projection client 570 may stop the projection from the user device 110 or stop displaying the received data (but without interrupting the streaming from the user device in order to avoid user interaction later when the projection may be resumed). The projection client 570 may notify gateway 100 of the change of the projection status via an "on external display status changed" message. Similarly, the projection engine 520 may stream overlay image(s) to the projection client 570 to restrict certain functions (or content) of the projected application or completely replace the streaming with information from the user device 110 via "display area request" and "display area data" messages.

In some embodiments, screens from the active source application may be captured using capabilities of the user device OS and application or content blocking may be implemented from gateway 100.

For instance, iPhones may include a "ReplayKit" feature. The Gateway 100 may register a screen broadcasting extension that (when allowed by the user) may capture the phone screen. The application capture component 505 may receive captured screen images and send the captured screen images to the projection engine 520, which may, encode and send the captured screen images to the projection client 570. The projection engine 520 may send the captured images to the recognition engine 525 and/or application control module 510 to perform application and/or screen recognition, functionality blocking, and control. The gateway 100 may operate in the background to capture the screen, and process, encode and send the captured screen to the projection client 570.

For Android phones, the phone screen may be captured using a "MediaProjection" API or similar resource. The gateway 100 may request the necessary permissions from the end-user and capture the phone screen when in the background. The application capture component 505 may receive captured screen images and send the captured images to the projection engine 520, which may encode and send the captured images to the projection client 570. The projection engine 520 may send the captured images to the recognition engine 525 and/or application control module 510 to perform application and/or screen recognition, functionality blocking, and control.

For greater flexibility and future extensibility, gateway 100 may use an adaptable logical model to represent the screen projection areas (or a "projection" model). Such a projection model may allow use of multiple displays or multiple areas within a display.

The projection model may include a "display" element. Such an element may represent an individual screen controlled by the source application 545. Connected resources 120 may include multiple physically separated displays. For example, in a vehicle, there may be multiple displays such as a center display (e.g., a head-unit), instrument cluster display, heads-up display, rear or passenger display, etc. There may be logical displays, such as two separate areas on the same physical display screen. Each display may be assigned a unique identifier.

The projection model may include a "display area" element. Such an element may represent an area within the display element where the data from gateway 100 should be presented. There may be multiple display areas within a single display element. The display areas may typically be rectangular in shape, but any shape may be supported. The display areas may overlap and the order in which they are displayed may be controlled thought a z-level property specifying the stack order of an element. Gateway 100 may configure the display areas using "display area request" messages and stream the actual data using "display area data" messages. Each display area may be assigned a unique identifier (referred to as a display area ID). The display area ID may be unique, regardless of the assigned display. In this way, one display area ID is enough to identify where each data frame from a display area data message should be presented.

The projection model may include an "encoding format" element. The data to be displayed at a given display area may be encoded in a format that may be supported by the projection client 570. Multiple encoding formats may be supported. The format selection may be based on a balance of image quality, speed, and bandwidth requirements. For instance, display data may be provided as bitmap data (e.g., via H264 video, moving picture experts group (MPEG) or similar formats such as MPEG-2, joint photographic experts group (JPEG), Motion JPEG, H265 video, etc.) or may be provided as vector data. On a given display there may be multiple display areas that use different encoding formats. For example, one display area may display the captured screens from a source application and another display area may display an overlay (e.g., having a text message and translucent rectangle) to block certain area(s) of the captured image(s).

For data provided in a bitmap format, some standards provide high compression rates while preserving the quality and many user devices 110 include hardware-accelerated support for such formats. For user devices 110 that do not support such formats, simpler bitmap representations of each individual captured frame may be used. To reduce the bandwidth requirements of each frame, the color depth of each pixel may be reduced (e.g., to RGB565) or transformed to a different color space (e.g., YUV422) and reduce the bits needed for each color. Each frame may be compressed using a fast compression algorithm. Furthermore, instead of sending full image frames, the gateway 100 may encode only the differences from the previous frame and then compress the difference data (e.g., using run-length encoding or another compression technique).

In order to support flexible display area arrangements, projection client 570 may support display areas that render vector data sent by the gateway 100. For certain type of images or other graphic content (e.g., simple uniform color blocks, text, etc.) vector data is a much more efficient way to represent frame data than any of the bitmap formats. The data may be represented with a standard vector format such as scalable vector graphics (SVG), dual express graphics (DXG), etc. In some embodiments, the data may be represented with a proprietary format using protocol buffers to store the records. Each record may describe one of the supported graphical primitives and provide the drawing parameters. The records may be further compressed to reduce the bandwidth requirements.

In order to establish a screen projection session, after establishing a connection between gateway 100 and projection client 570, the projection client 570 may send a "display capabilities" message to gateway 100. Gateway 100 may initialize the display(s) where the projection data is to be sent by sending a set of "display request" messages. If the requested display (and/or associated data format) is supported, the projection client 570 may send a "display response" message including a successful result code and/or other indication of success. For each display, one or more display areas may be initialized by configuring the dimension, type, and/or other attributes of the display area and sending a "display area request" message from gateway 100 to projection client 570. If the requested display area is successfully created, the projection client 570 may send back a "display area response" message including a successful result code.

To establish data streaming, gateway 100 may start screen capturing using a module such as application capture module 505. The captured images may be passed to the projection engine 520. Projection engine 520 may pass the captured image screens to the application control module 510. The projection engine 520 may construct a final image frame (which may include one or more overlays) for each display area. The projection engine 520 may send the display area frames to the projection client 570 via "display area data" messages.

The gateway 100 may select the optimal screen capture mode based on the currently available connection methods, the capabilities of the connected resource 120, and/or other relevant factors. For instance, as a user is projecting content, the user may disconnect or connect a cable between the user device 110 and the connected resource 120. As a result, the gateway 100 might update or modify the screen capture method. For example, the connected resource 120 might initially be connected to the user device 110 via a wired HDMI connection. However, if the cable is disconnected, the gateway 100 might switch to gateway capture mode and send content over a Wi-Fi connection without disrupting the user experience.

When application screens are captured using one of the techniques described herein, gateway 100 may need to work in the background as the user may want to interact with one of the source applications in the application library 540 rather than an application associated with gateway 100. In some embodiments, gateway 100 may execute a background companion application that is able to run in the background. iOS may have more restrictive rules regarding which applications are allowed to run in the background. The gateway 100 for iOS may use an external accessory protocol (EAP) connection to the connected resource 120 such that gateway 100 is able to run in the background (and not be terminated by the OS). Such background companion applications and/or other similar features may be used with any of the projection modes described herein. If the main data channel is not an EAP connection, then an alternative low bandwidth channel (e.g., Bluetooth) may be used to send occasional ping messages in order to maintain an active connection and such that gateway 100 continues running in the background. For Android-based user devices, there are typically no such requirements as background services may be allowed to run without restriction.

Application projection may utilize various display messages that may be used to configure and/or control video streaming (and/or other provision of content) from user device 110 to connected resource 120. Various examples of such messages are provided below.

One example display message may be a "display capabilities" message that may be sent by the projection client 570 to the Gateway 100 to indicate the capabilities of the connected resource 120. Gateway 100 may respond with a display capabilities response message. Each display capabilities message may include elements such as a supported external display technology element that indicates the supported external display technologies. The technologies may be represented as fixed constants as strings or integer flags that describe the capabilities, such as whether the device supports AirPlay, MiraCast, ChromeCast, HDMI, etc. Each display capabilities message may include a connection status element that indicates whether and/or how the user device 100 is connected to the connected resource 120 (e.g., wireless connection established, HDMI cable plugged-in, etc.) Each display capabilities message may include a display characteristics element that may include or indicate a list of display characteristics for each supported display. The display characteristics may include, for instance, screen resolution, color depth, supported video encoding formats, and/or other relevant information.

Another example display message may be a "display request" message. Such a message may be sent by the Gateway 100 to the projection client 570 in order to request registration of a display and start external display projection of source application content. The same message type may be sent by the projection client 570 to the gateway 100 in order to request user action. The receiver of a display request message may send a display request response message in reply. The display request response message may include elements such as a request ID that must be included in a display request response message to identify the display request message to which the response is sent. The display request message may include a display ID element that indicates the unique ID of the display for which this request is made. If the display request message is the first message from the gateway 100, the display ID may be generated by the gateway 100. The display request message may include a display description element that may identify the display for which the external display ID is assigned. The display description field may be populated when a new external display ID is assigned or generated. The display request message may include an action element that indicates the action to be performed as part of the request. Possible actions include "connect" (requests the client to connect the display to the user device 110 and begin projection), "disconnect" (requests the client to stop projecting, and disconnect, the display), "request user action" (requests the receiving party to show a prompt message to assist the user in establishing a connection), "show message" (requests the receiving party to display a specific message such as user instructions), etc. The request user action field may include at least one code that indicates a type of action (e.g., "pair device", "turn Wi-Fi on", "connect USB/HDMI cable", etc.). The display request message may include a message element that indicates the optional message to be displayed by the receiving party, if indicated by the show message action (and/or other appropriate criteria).

Another example display message may be a "display response" message. Such a message may be sent as a response to a display area request message. The display response message may include element such as a request ID (matching the received request ID of the corresponding display area request message), result (describes the result of the requested action and may include a predefined result constants such as "started", "stopped", "user action required", "failed", etc.), and error (includes information about the error associated with a failed request). The error field may be a composite field that includes an error code and/or a human readable error message.

Another example display message may be an "on external display status changed" message. Such a message may be sent by the projection client 570 or the gateway 100 when the status of the external display has changed. The projection client 570 may provide the current status of the display. The gateway 100 may send the on external display status changed message to query the projection client 570 for the current status. The on external display status changed message may include elements such as an external display ID of the associated display. The on external display status changed message may include a display description element (an optional field that is sent by the projection client 570). The display description field may be sent only when the display is first started or display status is requested. The display description field may be a composite value and may include sub-elements such as selected mode (e.g., streaming technology), screen resolution, frames per second (FPS), transport method, etc. The on external display status changed message may include a status element that may indicate the status of the external display. Such a status may be limited to a set of predefined constant values such as "started", "stopped", "paused", "resumed", "query", etc. The "query" status may be used to request a status update.

Another example display message may be a "capture display" request message. Such a message may be sent by gateway 100 to request that the projection client 570 manage capture of video frames from a given external display. The projection client 570 may respond with a "capture display" response message. Each capture display message may include elements such as request ID (a unique value identifying the request), external display ID (an identifier of the display for which this capture request should be executed), requested action (e.g., "start" video capture, "stop" video capture, etc.), capture resolution (e.g., the resolution at which the images should be captured), encoding type (indicates the video encoding format in which the images should be sent, such as H.264, compressed images, moving JPEG, etc.), frames per second (or "FPS", frequency at which images should be sent), and bandwidth (maximum bandwidth to be used for the result stream).

Another example display message may be a "capture display response" message that may be sent in response to a capture display request message. The capture display response message may include elements such as request ID (matching the ID of the corresponding capture display request), result (describes the result of the requested action and may include a predefined result constant such as "started", "stopped", "failed", etc.), and error (includes information about the error of a failed request and may be a composite field that includes an error code as well as a human readable error message).

Another example display message may be a "capture external display frame" message. Such a message may be sent by the projection client 570 every time a frame has been captured for an external display that has been configured to capture frames via a capture display request message. The frequency of the capture external display frame message may be configured through a capture display request message. The capture external display frame message may include elements such as external display ID (identifying the display from which the screen has been captured) and frame data (data for a given screen frame in the format and dimensions specified in a capture display request message).

Another example display message may be a "display area" request message. Such a message may be used by the gateway 100 to create, show, hide, destroy, and/or otherwise modify a display area for a given display. The projection client 570 may respond with a display area response message indicating success or failure. The display area request message may include fields such as request ID (unique identifier of the request), display area ID (unique identifier of the display area, which should be new and unique for a request to create a new area match the ID of a previously created display area), action (defines the action to be performed), and display area description (for newly generated display areas).

The action element may be selected from among elements such as "create" (requests recipient to create a new display area, in which case the display area description field should be populated), "show" (shows the specified display area), "hide" (hides the specified display area), "destroy" (destroys a previously created area, and may also hide the area), and "query" (application requests latest status of the specified display area). After a destroy request, the display area ID may no longer be valid and may be reused for a new display area.

The display area description element may define the parameters for a new display area. The display area description field should be populated only during a create action. The display area description element may include sub-elements such as "display ID" (indicates the ID of the Display where the new display area should be created), "location" (indicates the location and/or size of the display area), "z-level" (indicates the z-level for the display area), "encoding format" (indicates the expected encoding format for the data), transparency (indicates any transparency information for the area, such as alpha-blending), and/or other appropriate sub-elements.

Another example display message may be a "display area" response message. Such a message may be returned by the projection client 570 as a response to a display area request message. A display area response message may include elements such as a request ID (matches the request ID of the corresponding display area request), status (indicates the current status of requested display area, where status may be selected from discrete values such as "visible", "hidden", "destroyed", "failed" (if there is an error when trying to create the display area), and "error" (includes information about the error causing a failed request and may be a composite field that includes an error code as well as a human readable error message).

Another example display message may be a "display area data" message. Such a message may be sent for each frame of data for a given display area by the gateway 100. The display area data message may include elements such as display area ID (the identifier of the display area for which the data is provided) and frame data (data for a single frame to be displayed). The frame data may be provided in the encoding format specified in a display area request message.

The process may include receiving (at 760) UI event information at the gateway 100. Such UI event information may be received from connected resource 120. UI event information may include information related to various types of UI elements, provided in various appropriate formats. For instance, UI elements may include buttons associated with discrete values or functions. As another example, UI elements may include touchscreens that are able to capture one or more touch points and/or movement of the touch points.

As shown, process 700 may include applying (at 770) UI event information to the source application. Various input event data processing and/or handling algorithms may be utilized to receive and/or identify such UI event information, as described herein. UI event information may be applied to the source application via sets of messages sent using the DCCP. Gateway 100 may analyze received UI event information and apply the information to the source application via sets of messages or other data sent via an available communication channel.

The DCCP may include various sets of messages that may be used to configure the input capabilities of the connected resource 120 and, optionally, to control the user device 110 (and associated source applications). For example, an "input capabilities" message may be sent by the projection client 570 to the gateway 100 to describe the capabilities of the connected resource 120 in relation to the supported input capabilities. The gateway 100 may respond with its own input capabilities message.

The input capabilities message may include elements such as a request ID that uniquely identifies the request. The corresponding response should include the same request ID. The input capabilities message may include an input devices element that provides a list of input devices. For each input device in the list of input devices a "type" that defines the type of the input control (e.g., touch screen, keyboard, HW buttons, joystick, etc.) and an "interface" that defines the communication interface (e.g., HID, iPod Out, etc.) may be included or provided. The interface may describe an external user input control channel (e.g., HID over USB) and/or data sent over the main data channel (e.g., TCP/IP over Wi-Fi). The input capabilities message may include a data devices element that provides a list of data devices. For each data device in the list of data devices, information such as a "type" that defines the type of the data device (e.g., GPS, location provider, temperature sensor, accelerometer, gyroscope, etc.), an "interface" that specifies the connection method (e.g., data messages, HID, BT NMEA, iPod Location, etc.), and/or a "supported data input(s)" element that specifies which type of data (and in which units) will be provided may be included. Standards such Geneva in-vehicle infotainment (Genivi) vehicle signal specification (VSS) may be utilized.

As another example, a "configure input" message may be used to configure one or more input devices and/or input areas. The configure input message may initially be sent by the gateway 100. The same message may be returned as a response by the projection client 570.

The configure input message may include a request ID element that uniquely identifies the request. The corresponding response should include the same request ID. The configure input message may include a source action area element that defines the source action area. The source action area element may include a list of input area records, where each input area record may include an "input area ID" field including a unique identifier of the input area, a "shape" field that indicates the shape of the area, a "type" that indicates the type of input area, and an optional "device ID" field that includes the device associated with the given input area. The device ID may be sent by the projection client 570 in a configure input response message. The configure input message may include a target action area element that defines the target action area and may include properties such as shape, orientation, etc. The configure input message may include a keyboard devices element that provides a list of keyboard input devices. For each device in the list, a device ID and type may be included. The device ID may be assigned by the gateway 100. The keyboard devices element may include a "parameters" field that includes parameters for the keyboard device, such as which buttons to enable. The configure input message may include a data input devices element that provides a list of data input devices. For each data input device in the list, information such as device ID (the device ID assigned by the gateway 100) and data inputs (provides a list of the data inputs that should be sent by the device) may be indicated or included. For each data input, gateway 100 may assign a data input ID, which may be later used to send input data.

The DCCP may include a "control input" message that may be sent by the gateway 100 to start, stop, and/or otherwise control a given input device. The status of the command may be obtained through an external input notification message.

The control input message may include a control areas element that includes a list of control input areas. Each element in the list of control input areas may include fields such as "input area ID" (ID of the previously configured input area, unless "calibrate" action is used), "device ID" (ID of the device for the calibrate action), "action" (specifies the action to execute and may be selected from a set of discrete values such as "start", "stop", or "calibrate"), and "calibration parameters" (specifies the parameter for the calibration, may include parameters such as step, scale, docking mode, docking position such as "nearest" or "top-left corner", etc.).

The control input message may include a data input devices element that specifies a list of data input devices to be started and/or stopped. For each data input device in the list, information such as device ID (ID of the previously configured device), action (the type of action to perform for the device, such as "start" or "stop"), and parameters (provides additional parameters for the device, or for each device input, such as frequency of data collection, any conversions, etc.) may be included.

The DCCP may include a "send input event" message that may be sent by the gateway 100 to request that the projection client 570 executes a specified input event with a given device (where the device ID should have been previously configured via a control input message). The send input event message may be used to send events (whether input or data events) from the projection client 570 to the gateway 100 via the main data channel.

The send input event message may include an "input events" element that includes a list of events to send, where each entry in the list may include an "event ID" field that uniquely identifies the event, an "event type" field that specifies the type of event to send (e.g., move cursor, mouse up, mouse down, etc.), and a "position" field that defines the position of the event (where the position may be absolute or relative). The send input event message may include a "data events" element that includes a list of data events, where each entry in the list may include a "data input ID" field that uniquely identifies the input device previously assigned with a control input message, a "timestamp" that indicates when the data was collected or received, and a "data" field that includes the actual data payload.

The DCCP may include an "external input notification" message. Such a message may be sent by projection client 570 when an external input event has been performed on the connected resource 120 and sent via the external user input. The message may be received by the gateway 100. The external input notification message may include (if requested in a send input event message) an event ID element that uniquely identifies the event. The external input message may include an event type element that indicates an event type (e.g., "input started", "input stopped", "up", "down", "single touch", "multi-touch", etc.). The external input notification message may include an area ID element that includes the unique identifier of the area where the event occurred, a device ID element that includes the unique identifier of the input device that generated the event, and a timestamp element that indicates when the even occurred (specified with respect to the projection client 570).

User inputs (and associated UI event information) may be handled using various modes including an external user inputs mode and a gateway user inputs mode. The gateway 100 may select the optimal user input processing mode based on the currently available connection channels, the UI capabilities of the connected resource 120, and/or other relevant factors. User input handling may attempt to control the source application 545 based on UI information received from the connected resource 120, as if the end consumer is interacting with the user device 110 directly.

For input control that relies on pointing devices such as a mouse, touch screen (single or multi-touch), stylus, digitizer, and/or other similar types of devices, the gateway 100 may use or implement a flexible configuration of associated input areas on the connected resource 120 and user device 110. One example of such flexibly configured area was described above in reference to FIG. 2.

Returning to process 700, one way to control the source application 545 is to use any standard (external) available control paths. Such an approach may be referred to as "external user input control". One or more external control channels may be included at (or otherwise provided by) user device interface 575. One such channel is the HID standard initially introduced for USB and now supported over various communication pathways such as Bluetooth, serial, ZigBee, etc. The HID channel may support various different types of devices. The user input device (e.g., connected resource 120) may present a HID descriptor to a host. The HID descriptor may include an array of bytes that describes the data packet structures used by the device, indicates the number of packets the device supports, the size of the packets, the purpose of each byte and bit in the packet, and/or other relevant information. The user input device may send the actual data in subsequent HID report records that conform to the previously sent HID descriptor.

The connected resource 120, via a device control module that may be included in (or implemented by) the user device interface 575, may be able to mimic various input device types to the user device 110 (and/or associated source application).

One example input device type is an "absolute pointing device". Such devices may be included in a category of HIDs used to describe a single or multi-point pointing device such as a digitizer, stylus, single or multi-touch pad, etc. The main characteristic of such devices is that the connected resource 120 may send absolute coordinates for single and/or multi-touch points and thus simulate touch events on, for instance, the main screen of a user device 110.

In some embodiments, an absolute pointing device may be initialized by generating or otherwise preparing a HID descriptor at the user device interface 575. The descriptor may define the dimensions or limits of the HID coordinates that may be sent via HID reports or messages. The user device interface 575 may send the HID descriptor to the user device 110 via the external control channel (e.g., via USB) and/or via other available communication channels.

Absolute pointing device input data may be generated if the projection client 570 receives pointing device input event data (e.g., touchscreen, mouse, joystick, external touch pad, and/or other such input event data). The projection client 570 may evaluate the received coordinates to determine whether the coordinates are located within any of the input areas defined in a configure input message, for instance. If there are multiple touch points (related to the same event) that are located within different areas, the event data may be handled by different handlers based on the locations of the areas. For instance, if a touch point is initiated in a first input area and moves into a second of input area, the information may be ignored. If a touch point is initiated in, and remains within, a first input area, the event information may be handled by an event handler associated with the first input area.

If the coordinates are located within an external input area, the event information may be forwarded to the user device interface 575 which may translate the input coordinates (for each associated touch point), send the HID report (may include multiple reports or entries for each touch point, based on the capabilities of the user device 110) via an external control channel or other available communication path, and send an "external input notification" message to the Gateway 100. Translation of input coordinates may include scaling and transposing the received input coordinates from the projection client area 220 coordinates to target action area 210 coordinates, then scaling and translating to HID coordinates (taking into account the screen orientation reported in the configure input message).

Another example input device type is a "relative pointing device". Such devices may be included in a category of HIDs used to describe a single pointing device such as mouse, track pad, track ball, etc. The main characteristic of these type of devices is that the resource 120 may send relative coordinates for the cursor movement on the main screen of the user device 110. Associated "click" type events (for one, two, or more buttons having various different configurations) may be sent as part of a HID report.

If the connected resource 120 uses a touch screen as an input device and needs to control the user device 110 via a relative pointing device interface, then the absolute coordinates must be converted to relative cursor movements and clicks. In order to implement such a conversion, the connected resource 120 must be aware of characteristics of the relative pointing device, such as steps, current position, direction, etc. This information may be discovered through a calibration process. In some embodiments, in order to guarantee recovery from errors, gateway 100 may utilize cursor docking.

The calibration process through which the connected resource 120 may discover various characteristics of the pointing device supported by the user device 110, such as cursor steps (indicating the number of steps the cursor moves on the screen for one step movement via the HID). There may be a separate steps value for each of the x and y axes. In some embodiments, step pair values may be specified based on speed of the movement (if there is an acceleration curve supported by the user device 110). The calibration process may further discover characteristics such as the current position of the cursor and the docking step (number of relative steps that should be sent via the HID to dock the cursor). Different steps values may be specified for each of the docking corners.

Calibration may typically be performed for each newly connected user device 110 and/or when the OS or settings of the user device 110 are updated. To determine if calibration is needed, gateway 100 may determine whether the current calibration parameters are valid. Such calibration checking may include displaying, from the gateway 100 to the user device 110, a full screen (e.g., a calibration check screen) and may begin capturing all input events from the full screen. The gateway 100 may start the required pointing device by sending, to the projection client 570, a control input message including the current calibration parameters. The projection client 570 may pass the message to the user device interface 575 which may store the device parameters and start the HID device. The projection client 570 may detect the cursor position by sending a send input event message providing for zero (e.g., 0,0) movement offset and button pressed states. The user device interface 575 may send one or more HID reports indicating the zero movement and down/up button states. The emulated clicks may be received at the gateway 100 through the calibration check screen. The gateway 100 may store an initial position associated with the emulated clicks.

The gateway 100 may send a series of pointing device moment and click events via one or more send input event messages. The gateway 100 may send absolute coordinates that fall within calibration check screen dimensions. The user device interface 575 may send, via the HID channel (e.g., an external control channel) one or more HID reports based on the received send input event messages. The absolute coordinates may be translated (based on the current calibration parameters) to a set of relative events. The gateway 100 may receive and capture the clicks from the calibration check screen and associate the clicks with the input events. The gateway 100 may calculate an error score based on the difference between the received cursor position the expected position based on the current calibration parameters. Based on the error score, the gateway 100 may determine if the calibration is valid (e.g., if the error score is less than a specified threshold value). If calibration is not needed, then the projection client may begin sending UI event data.

The calibration process may be a collaboration between the gateway 100 and the projection client 570. To begin the calibration process, the gateway 100 may send a "control input" message to the projection client 570 that sets the input area associated with the current HID device to a "calibrate" state. The user device interface 575 may send the HID descriptor of the relative pointing device to the user device 110 over the external control channel or other appropriate channel. The user device interface 575 may send an external input notification message to the gateway 100 including the input area ID and status indicating that the calibration process has started.

The gateway 100 may display a full screen on the user device 110 (e.g., a calibration screen) and start capturing all received events from the calibration screen. For OSs such as iOS and Android, there are APIs that allow third party applications to go into full screen mode. There may be system areas for which the gateway 100 cannot receive the HID input. The gateway 100 may detect such areas and manage the calibration process accordingly.

The gateway 100 may send the calibration events via send input event messages. For example, the gateway 100 may send different calibration sequences, such as [8, −8], [−8, 8], [16, −16], [−16, 16], [24, −24], [−24, 24], [32, −32], and [−32, 32], where each pair represents relative movement along the x and y axes (e.g., [<offset x>, <offset y>]) followed by a click event to enable detection by the gateway 100. After each event, the projection client 570 may respond with an external input notification message.

The Gateway 100 may capture and record the events from the calibration screen during the calibration sequence. The gateway 100 may filter out any unexpected events. For example, the end-user might accidentally interact with the user device screen and generate input events. Unexpected or incorrect events may be filtered based on various relevant criteria. For instance, specific button presses may be used to indicate that the data is associated with a calibration click (e.g., a middle mouse button click, or a series of clicks such as left click-right click-left click). As another example, special up/down sequences of clicks may be used to indicate whether a click is associated with calibration. Such sequence may be very hard to recreate accidently (e.g., there may be a down/up/down/up sequence for each point to check). As still another example, the captured events may be matched to notifications received from the projection client 570. The gateway 100 may record the received screen points (in user device screen coordinates) and associate the received screen points with the emulated events. Gateway 100 may store a timestamp indicating when the events were received.

The Gateway 100 may calculate the calibration characteristics based on the recorded points. Steps for each of the coordinate axes may be calculated by determining the relative movement of the screen pointer (from the screen points) with respect to the movement generated by the input device using the provided input points. If there are different steps based on the speed of the events, then they are recorded as separate steps for that speed. The current cursor position may be extracted form the last recorded screen point. The docking steps may be calculated based on the estimated steps and the size of the user device screen.

The gateway 100 may send the calibration characteristics to the projection client 570 via a control input message that includes the device ID of the calibrated device and the calibration parameters. The projection client 570 may apply the calibration parameters and store the parameters for future sessions. The gateway 100 may perform calibration checking and, if the calibration checking is not successful, retry the calibration, where the number of retries may be configurable.

One challenge with relative pointing devices is that the devices are designed to control movement of a cursor that an end user can see. As such, the target devices do not report an actual position via the HID interface. The projection client 570 needs to keep track of the cursor location. An expected cursor position may be calculated based on the provided input HID reports and previously calculated calibration parameters. However, there could be errors and the actual cursor position might be incorrect. For example, the movement steps calculated during calibration could have a small error. Even a relatively small error may accumulate after few movements, and the resulting estimated cursor position and the actual position could diverge significantly.

To overcome such errors, gateway 100 may implement an error correction mechanism using cursor docking. Docking may involve moving the cursor to a known position, so the projection client 570 is able to confirm the cursor position and perform accurate relative movements from there. Docking relies on the fact that excessive pointer movements to one of the corners of the screen will result in the cursor being "stuck" at that corner, resulting in a known position.

The cursor may be docked at any of the four corners of the screen. To dock the cursor, the projection client 570 may send a set of docking commands, such as relative movement events that are equal to or exceed the dimensions of the user device screen. To account for errors in calibration data, calculated screen dimensions may be multiplied by two (or some other appropriate factor) to ensure that the cursor will dock at the corner.

In some cases, if the screen is high resolution sending too many points might slow down performance. In such cases, the multiplication factor may be tuned to send less excessive movements (e.g., by changing the factor from two to one and two tenths). Docking may be performed by the projection client 570 as part of the normal event sending sequence.

Various docking modes may be utilized. Such docking modes may include a "before click" mode where the projection client 570 may first dock the cursor and then from the known dock position move the cursor to a desired position. Such an approach ensures that the final position will be the most accurate. A disadvantage is that the end user might see the cursor moving to the dock position and back.

Docking modes may include an "after click" mode where docking is performed after a click event is received. Such an approach reduces the visual movement of the cursor before the click. If there are other methods of moving the cursor that cannot be detected by the projection client 570 (e.g., the user may interact with the user device 110), then the estimated cursor position for the next event might be inaccurate.

Docking modes may include an "after inactivity" mode where docking may be performed after a specified duration of inactivity. Such an approach reduces the visual movement of the cursor to and from the docking point. Similar to the after-click mode, if there are other methods of moving the cursor that cannot be detected by the projection client 570, then the estimated cursor position for the next event might be inaccurate.

The projection client 570 may select a docking mode and target location based on information received from the gateway 100 via a control input message. Docking may be performed with reference to a specific corner or to a nearest docking position.

Once a pointing device has been calibrated and/or validated to work correctly, UI event information such as touch event information received from a connected resource 120 may be emulated, by gateway 100, to user device 110 as relative pointing device event information. During use, the projection client 570 may receive or identify a pointing device input event (e.g., a touch screen, mouse, joystick, external touch pad, and/or other such input).

The projection client 570 may determine whether the received coordinates fall in any of the input areas received via the configure input message. If there are multiple touch points that fall within different areas, the points may be handled by different handlers based on the areas. If the touch point is initiated in a first area, and moves to a second area, the associated event information may be ignored. If the touch point is initiated in a particular area, and remains in that area, the associated event information may be handled by the corresponding handler of the particular area.

If the received input coordinates fall within an external input area, the event information may be forwarded to the event to the device control module of user device interface 575. The device control module may translate the received coordinates, by, for each matching touch point, scaling and translating from projection client area coordinates to target action area coordinates, then scaling and translating to HID coordinates (taking into account the orientation reported in the configure input message).

The device control module may perform docking, based on the configure input settings. The device control module may calculate the necessary relative movement events based on the current input position and the target screen cursor position. The relative movement calculation may use the calibration parameters received via the configure input message. The device control module may send the HID reports (where each touch point may be associated with multiple reports) via, for example, the external control channel. The device control module may send an external input notification message to the gateway 100.

In addition to, or in place of, touch screen or other touch-based inputs, HID elements may include other input types, such as keyboards, game controllers, etc. Such elements may be or include physical and/or virtual components. For instance, some connected devices 120 may include a physical keyboard or keypad while other such devices may present a keyboard or similar resource via a touch screen display.

When a keyboard HID is available, projection client 570 may report support for such a keyboard HID via the input capabilities message. As a result, the gateway 100 may request activation of the keyboard to receive data for an input field or simulate certain actions on the source application 545. Before activating the keyboard, the gateway 100 may configure keyboard devices by sending a configure input message.

The keyboard HID may be activated, for instance, when data is needed for an input field in the source application 545. For example, a user might be required to enter a search term, username, password, or similar information. The gateway 100 may automatically detect that a text input field has the application focus (e.g., based on information received from the source application and/or OS interface, if any) and instruct the projection client 570 to activate the keyboard HID by sending a control input command, specifying the device ID for the previously configured keyboard device. As a result, the projection client 570 may use an external keyboard connected to the connected resource 120 or show an onscreen virtual keyboard. Any button press information received from the keyboard may be sent to the user device 110 via the external control channel.

The keyboard HID may be used to simulate or emulate various actions at the active source application 545. For example, the keyboard HID may simulate a "back" button, media play/pause, next/previous, etc. The gateway 100 may initiate such emulation by starting the keyboard HID through the control input message and specifying only the keycodes that are to be supported (e.g., those associated with a consumer control devices such as a mouse, keyboard, etc.).

When a specific command needs to be simulated based on received UI event information, the gateway 100 may send an input event message specifying the virtual keycode for the command to simulate. As a result of the message, the device control module may send the required HID report with the keycode. The device control module may translate the keycode to a value that the active HID device understands or recognizes.

The HID protocol is highly configurable, and many different types of inputs may be provided using this protocol. For example, consumer control input devices such as game controllers may be handled in a manner similar to the keyboards, absolute and relative pointing devices described above.

Any new input devices may be easily added to the system through the input capabilities messages where the projection client 570 may report available HID capabilities and the gateway 100 may configure such devices via the configure input message, and then initiate use of a specific device via the control input message. User interactions with the connected resource 120 may be sent as HID events, or gateway 100 may instruct the projection client 570 to simulate a specific HID event via a send input event message.

In addition to HID, the user device 110 may support other proprietary or open external input methods such as iPod controls, control via the audio interface, etc. Similar operations as those described above may be used for such interfaces.

In addition to or in place of the external user inputs, user inputs to the source application 570 may be provided via the gateway 100. Depending on the capabilities, versions, and restrictions of the user device 110, there different APIs may be provided to third-party applications that allow simulation of input events. For example, various Android third-party applications may be used to simulate keyboard and touch events through an accessibility service (e.g., using an accessibility interaction client class) if the necessary permissions are provided to the gateway 100. If the gateway 100 has system privileges (e.g., root access) the gateway 100 may emulate input events by interacting with the input subsystem of the OS.

In order to send input events from the gateway 100, the projection client 570 may receive or identify a pointing device input event (e.g., touch screen, mouse, joystick, external touch pad, and/or other such inputs). The projection client 570 may determine whether the received coordinates are located in any of the input areas defined via the configure input message. If there are multiple touch points that fall within different areas, the different points may be handled by the different handlers associated with the different areas. If the touch point is initiated in a first input area, and moves into a new input area, the input event information may be ignored. If the touch point is initiated in, and remains within, a particular area, then the touch point may be handled by the handler associated with the particular area.

If the coordinates are located within a gateway input area, the event data may be sent to the gateway 100 in a send input event message. In response to the send input event message, the gateway 100 may send the event information to the source application 545 using one of the supported channels and/or algorithms.

Figure 8:
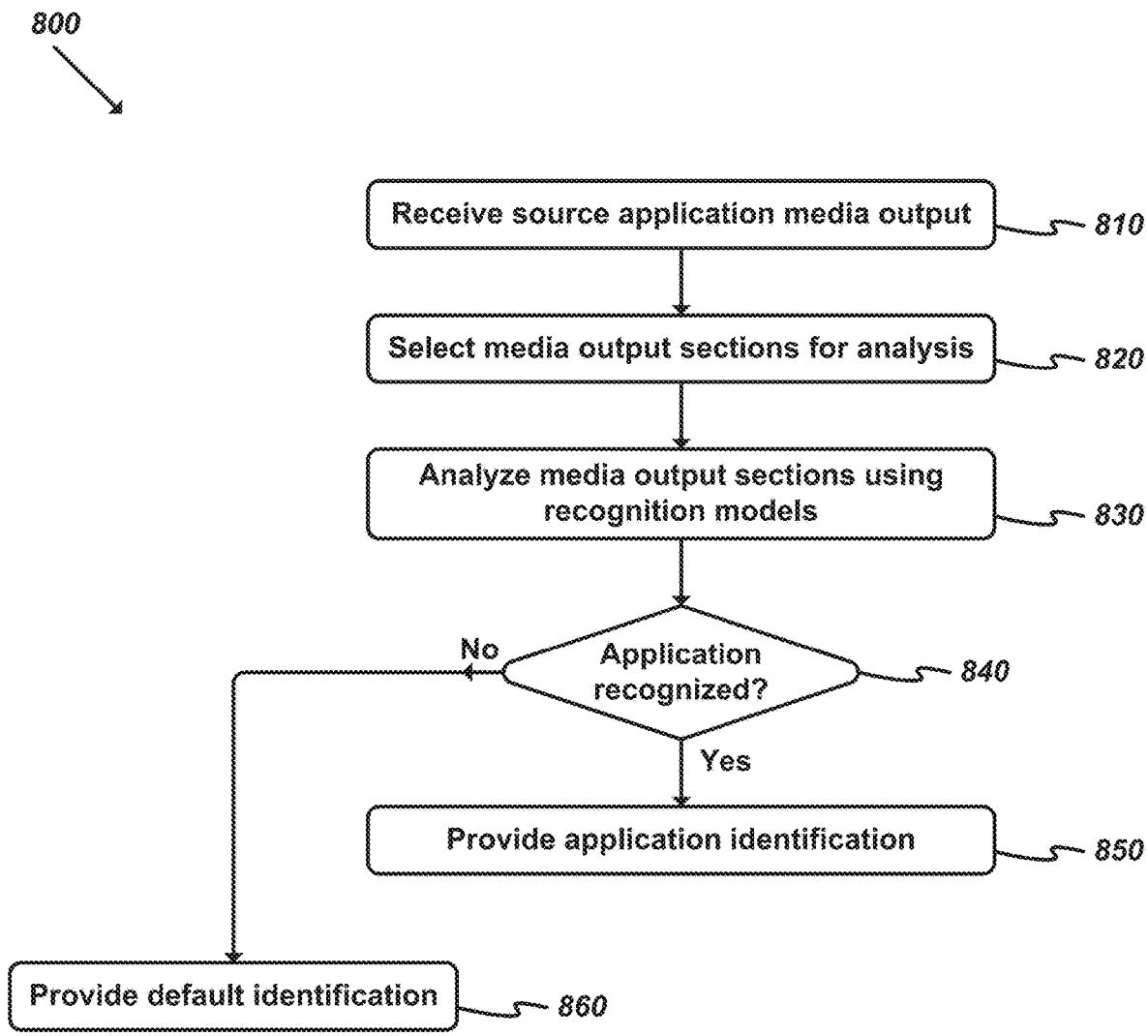
FIG. 8 illustrates a flow chart of an exemplary process for identifying an application executed by a user device.

FIG. 8 illustrates an example process 800 for identifying a source application executed by a user device 110. Source application identification was described above in reference to FIG. 3. Process 800 may be performed whenever a new application is launched (e.g., based on generation or receipt of a current application message indicating launch of a source application, change in screen output, and/or other relevant criteria). In some embodiments, process 800 may be performed by gateway 100.

As described above, some user device OSs may provide an interface or other resource through which gateway 100 may receive active or current application information. Process 800 may be performed when no such interface is available and/or to implement different and/or additional recognition algorithms than those provided by the OS interface. In addition, process 800 may be used to filter content provided via connected resource 120. For instance, content areas displaying video or other distracting elements may be filtered or blocked during certain operating modes (e.g., a mode associated with a moving vehicle).

As shown, process 800 may include receiving (at 810) source application media output. Such output may include, for instance, sets of screen images or other video content, audio content, and/or other media content. Such content may be received via a component such as application capture element 505.

Process 800 may include selecting (at 820) media output sections for analysis. Such sections may be selected or otherwise designated in various appropriate ways. For instance, if data is received in a video streaming format, each entire frame may be selected for analysis. As another example, some source applications may include graphical user interface (GUI) elements such as display windows that may be indicated in various ways, depending on the format of the received data. In such cases, areas associated with video display or other active content may be selected for analysis, while areas associated with text, static images, or other such elements may be ignored. As another example, as described above, various areas may be used for GUI elements, logos, or other such content.

The process may include analyzing (at 830) the selected media output sections using available recognition models (and/or other appropriate ways). The recognition models may define elements such as locations of output sections to analyze, color profiles, matching image elements, and/or other appropriate information. Further, each recognition model may be associated with a specific source application (as indicated by the application ID).

As described above, various image comparison algorithms may be indicated by the recognition models, including comparison techniques such as color bin based analysis (as described in reference to color matching), pixel-by-pixel comparison (e.g., when a number of changed pixels exceeds a threshold value or ratio), a perceptual hashing algorithm (e.g., an algorithm that uses hashing to produce a snippet or fingerprint of various forms of media), threshold-based scene detection (e.g., the intensity and/or brightness of a current screen may be compared with a specified threshold value and analysis may be triggered when the intensity and/or brightness exceeds the threshold), and/or other appropriate direct image comparison algorithms.

As shown, process 800 may include determining (at 840) whether the application was recognized. Such a determination may be made based on evaluation criteria indicated by an associated recognition model (e.g., minimum matching score or other metric threshold). If the application is recognized the process may include providing (at 850) the application ID and/or other appropriate information, where the application ID may be retrieved from the matching model used to recognize the source application.

The process may include providing (at 860) a default identification (if available) or otherwise indicating that no matching application was recognized. Such a default application ID may be associated with a type of application or content. For instance, some embodiments may include a default video application that is associated with source applications that provide full-screen video output. Such a default application may be associated with various associated restrictions (e.g., no video while vehicle is moving) and/or other attributes as described in reference to the application catalog.

Figure 9:
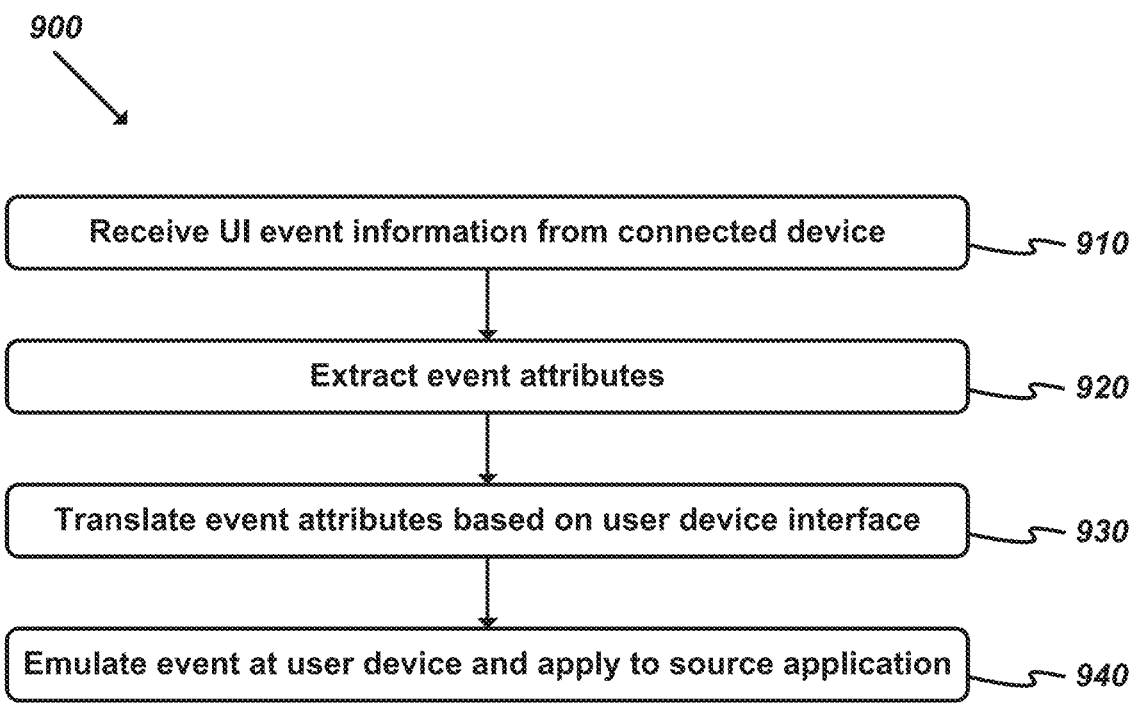
FIG. 9 illustrates a flow chart of an exemplary process for receiving commands at a connected resource and applying the received commands at a user device.

FIG. 9 illustrates an example process 900 for receiving commands and/or other UI event information at a connected resource 120 and applying the received commands at a user device 110. Such UI events may be received via an external control channel or as gateway user inputs as described herein. The process may be performed when a connection is established between a gateway 100 and projection client 570. In some embodiments, process 900 may be performed by gateway 100.

As shown, process 900 may include receiving (at 910) UI event information from the connected resource 120. Such event information may include various types of event data, depending on the various UI features or properties (e.g., whether absolute or relative pointing is used) that may be associated with various input areas. The event information may include information related to multiple events and/or sub-events (e.g., a click event included in a click-and-drag operation).

Process 900 may include extracting (at 920) event attributes from the receive UI event information. Such event attributes may include, for instance, sets of coordinates, action indicators (e.g., "down", "up", etc.), and/or other appropriate information (e.g., identification of a keyboard button or key).

The process may include translating (at 930) the event attributes based on the user device interface(s) available and/or other appropriate criteria. For instance, absolute coordinates may be translated to relative movement information. As another example, action locations may be mapped from resources such as projected target area 230 to target action area 210 (and vice-versa).

As shown, process 900 may include emulating (at 940) an event at the user device in order to apply the UI event to the source application. Such emulation may utilize various messaging algorithms and/or elements, and/or other appropriate ways of simulating or emulating event data, as described herein.

Figure 10:
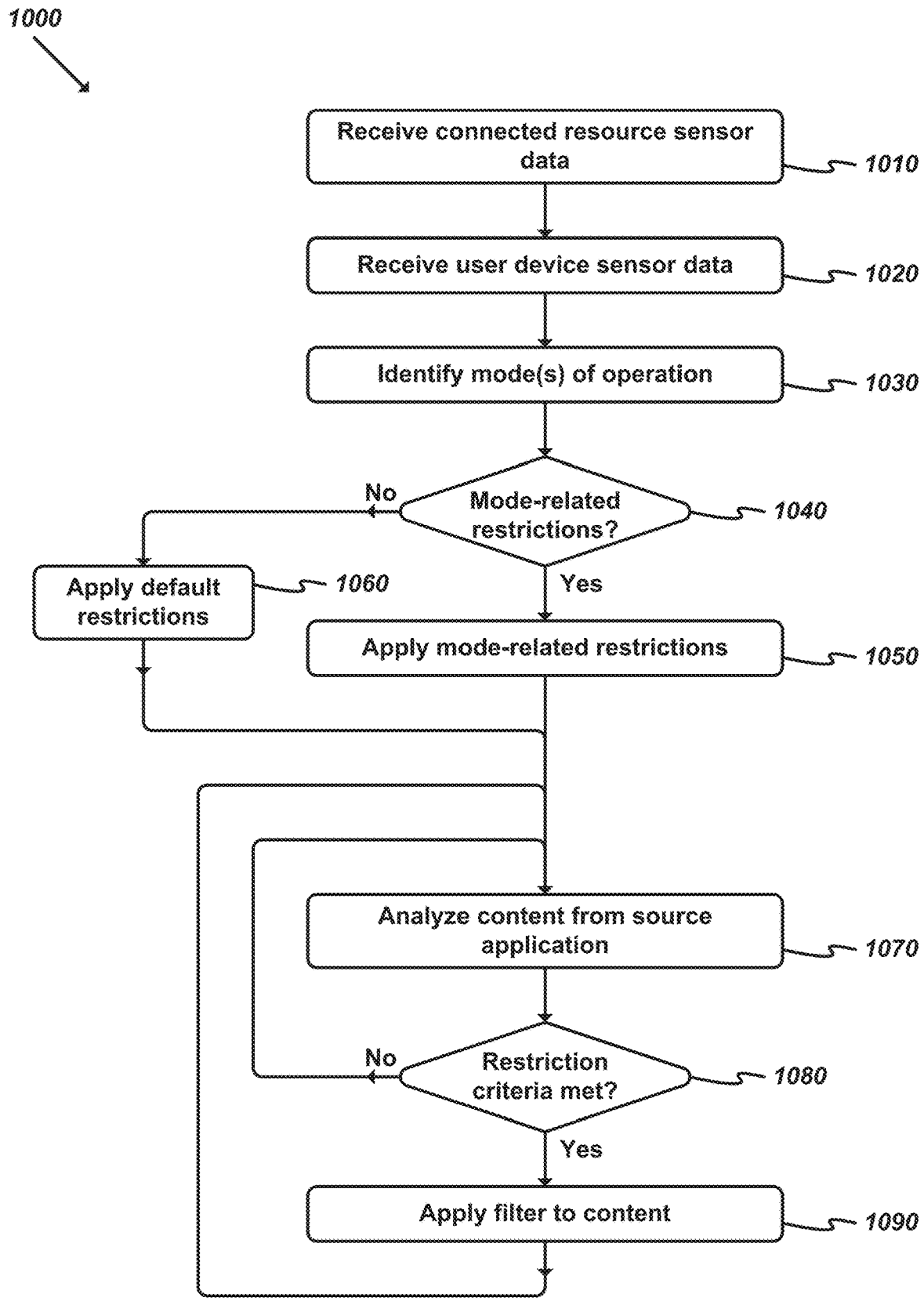
FIG. 10 illustrates a flow chart of an exemplary process for filtering application content based on operating mode of a connected resource.

FIG. 10 illustrates an example process 1000 for filtering application content based on operating mode of a connected resource 120. The process may be performed whenever content is provided by gateway 100 to projection client 570. In some embodiments, process 1000 may be performed by gateway 100.

In addition to detecting the active source application, in some embodiments the current screen or mode of the application may be detected. Such detection may be used to restrict certain functionality or UI elements depending on the operating mode of the connected resource 120 (and/or associated element such as a vehicle). For example, if the connected resource 120 is an in-vehicle display unit and the vehicle is moving, in many countries driver distraction regulations forbid the unit to show moving images (such as videos) or allow the user to enter text using a keyboard. Process 1000 may detect if such content is being shown and block such content or block projection of the entire application. Similar application restrictions may be required or otherwise may be implemented for other industries and use cases.

As shown, process 1000 may include receiving (at 1010) connected resource sensor data, if available. Depending on the type of connected resource 120 (e.g., a vehicle), various different types of sensor data may be available and/or relevant. For instance, motion data may be provided (or calculated) based on information received from a GPS element, accelerometers, gyroscopes, etc. that may be included at or associated with the connected resource 120.

Process 1000 may include receiving (at 1020) user device sensor data. In addition to, and/or in place of, the connected resource sensor data, some embodiments may receive sensor data from a user device, such as positioning or movement information.

The process may include identifying (at 1030) mode(s) of operation associated with a source application 545, connected resource 120 (and/or associated system or device such as a vehicle), and/or other relevant components. Process 1000 may identify various parameters and/or attributes associated with such modes of operation (e.g., speed of a moving vehicle, processor load of a connected resource 120, network connectivity of a user device 110, etc.). Such data may be received from the various elements, determined based on received data such as sensor data, and/or be otherwise generated or received.

The gateway 100 may detect a current mode of the source application 545. Such detection may be performed via resources such as OS interface 560, notifications development kit 555, and/or recognition engine 525 (e.g., using the various image recognition algorithms described herein). The current screen (or other source application output) may be reported to the application manager 515. The application manager 515 may use the application mode restriction information from the application catalog 590 to determine if any or all UI elements should be blocked or otherwise filtered.

Similarly, the gateway 100 may detect a mode of operation of connected resource 120, such as whether the resource is stationery or moving. Such a determination may be made by comparing received connected resource and/or user device sensor data to various mode recognition models. Such models may indicate, for instance, a minimum distance and/or speed necessary to indicate vehicle motion. Modes of operation may be related to temporal attributes (e.g., daytime versus nighttime operation). For instance, displayed content may be dimmed or brightened depending on time of day or sensed light conditions (e.g., using data received from a user device camera or connected resource camera or other sensors).

In similar ways, the gateway 100 may detect a mode of operation of an associated user device 110. For instance, gateway 100 may determine what type of connection is available from the user device 110 to a resource such as a media server (e.g., Wi-Fi, cellular, etc.). As another example, gateway 100 may receive user device information such as processor load, memory usage, and/or other metrics that may be used to detect various modes of operation.

As shown, process 1000 may include determining (at 1040) whether to apply any mode-related restrictions. Such a determination may be made based on the various identified modes of operation, restriction modes and/or other operating rules, and/or other appropriate criteria.

In order to manage various types of connected resources 120 and support different restriction modes, a generic restriction level value may be reported by a connected resource 120 via a "connected device state" message that may include a restriction level element. The current restriction level value may be passed to the application manager 515. Depending on the type of the connected resource 120, there may be different restriction level values.

For example, possible restriction level values for an in-vehicle system may include "none", "minor", "major", "full", and/or other similar values and/or indicators (e.g., the example values may be mapped to the values zero to three). In this example, a restriction level of none (or zero) may indicate that no restrictions should be applied (e.g., the full UI may be allowed) and may typically be utilized when the vehicle is not moving and a user is not engaged in driving (e.g., when a parking brake engaged is engaged or an automatic transmission is in "park").

A restriction level of minor (or one) may indicate that minor restrictions should be applied (e.g., most of the UI may be allowed) and may typically be utilized when the vehicle is moving very slowly (e.g., less than eight kilometers per hour) or has stopped at an intersection (e.g., when no motion is detected and an automatic transmission is in "drive" or "reverse").

A restriction level of major (or two) may indicate that major restrictions should be applied (e.g., only UI elements related to driver-assistance functions may be allowed) and may typically be utilized when the user is fully engaged in driving and the vehicle may be moving at relatively high speed (e.g., greater than eight kilometers per hour).

A restriction level of full (or three) may indicate that full restrictions should be applied (e.g., no driving distraction may be allowed, and the UI may be completely blocked) and may typically be utilized when the vehicle is moving at very high speed and/or otherwise operating under dangerous conditions.

The above example describes various possible restriction level values for an automotive implementation. Various other implementations may include various other restriction level values and/or associated properties based on the specific requirements of a particular implementation. For example, medical and/or industrial implementations may be associated with various other sets of restriction level values.

In some situations, a connected resource 120 may report its operating mode. However, in some embodiments the gateway 100 may determine the operating mode (and/or any associated restriction level) independently of the connected resource 120. Such an approach may be useful for cases where a connected resource 120 may be tampered with and cause unsafe conditions. For example, in an automotive system the head-unit typically detects if the vehicle is driving using a wire from the parking brake. Such a wire may be easily bypassed by the end consumer and thus remove the possible driver distraction restrictions from the system.

The gateway 100 may independently verify whether the vehicle is moving using location and/or movement sensors of the user device 110 and thus report the correct operating mode and identify the correct restriction level. Gateway 100 may report the identified restriction level to the application manager 515.

The determination whether to restrict the currently projected source application 545 based on the current operating mode of the connected resource 120 (and/or other components) may be made using the application mode restrictions record in the application catalog 590.

A possible structure for the application mode restrictions for a given application in the catalog is described in Table 2 below. This example utilizes a hierarchical structure stored in a text or binary form. The storage format could utilize JSON, XML, protocol buffers, etc. The application mode restrictions record may be associated with a list of matching rules that define restrictions and permissions for the applications and/or associated widgets. The application mode restrictions record may follow a hierarchical matching structure similar to cascading style sheets (CSS). Table 2, below, describes various example high-level properties that may be associated with each rule record:

TABLE 2

| Name | Description |
| --- | --- |
| screen ID | (Optional) May define the unique ID of the screen to which the rule applies. May have precedence over the widget ID and widget type elements. |
| widget ID | (Optional) May define the unique ID of the widget to which the rule applies. May have precedence over the widget type element. The widget ID may be ignored if a screen ID is present. |
| widget type | (Optional) May define the type of widget. Example types may include "any", "video", "button", "edit", etc. The widget type field may be ignored if the widget ID element or screen ID element is defined. |

TABLE 2-continued

| Name | Description |
| --- | --- |
| restriction level | (Required) May define the level at which the rule should be applied. Restriction may take effect at the restriction level and all upper levels (e.g., a restriction level of minor may indicate that the associated restriction should be applied at restriction levels major and full) unless overwritten by another rule. |
| restriction | (Required) May define the restrictions for the current rule. The restriction field may include, for instance, one or more of the discrete restriction level values separated by the pipe symbol ("|"). |
| blocking message | (Optional) May specify the message to be displayed if the current screen or widget is blocked. The blocking message could be a JSON object that includes messages in various languages. A "default" blocking message property (e.g., "content blocked") may be displayed if there is no better matching element or language. |

Restriction rules may overlap based on the definition of widgets and screens. The main matching principle is that the most-specific rule is selected before a more generic one. For instance, a widget is more specific than a screen and a widget ID is more specific than a widget type.

When the application manager 515 matches rules to the screen being projected, the application manager 515 may first apply screen rules (if any), then rules that apply to widget types, and then rules for a specific widget. In this way, for example, an application may be configured to block an entire screen and only allow interaction with one widget, by defining a permissive rule for that widget ID.

Restrictions may filter or block specific operations (or data) from the UI associated with a projected application. Restrictions may be associated with applications (or screens, widgets, etc.) via the application catalog 590 as mode restriction elements 690 and/or other appropriate ways. Restrictions may be defined as flags such that multiple restrictions may be associated with a single rule. Table 3 below lists some example restrictions that may be supported.

TABLE 3

| Name | Description |
| --- | --- |
| none | May indicate no display or interaction restrictions. The widget or screen should be displayed without filtering. |
| hide | May indicate the widget or screen should be hidden. |
| block display | May indicate that the view or screen should be covered or replaced with a message. |
| no keyboard | May block the keyboard from appearing for editable widgets. If the keyboard is blocked due to a restriction level, user interaction may be required for the keyboard to be shown when the restriction level is being lowered. |
| no touch | May indicate no touch interactions should be allowed for the widget or screen. |
| no HW buttons | May indicate no interactions with the hardware buttons should be allowed. |
| no interaction | May indicate no user interactions allowed (including hardware buttons) with the widget or screen. |

Process 1000 may include, if the process determines (at 1040) that mode-related restrictions should be applied, applying (at 1050) the mode-related restrictions identified in the matching rules. Such restrictions may be applied in various appropriate ways, depending on the connected resource attributes, rule content, and/or other relevant factors. For instance, a block display restriction may cause streaming data to be halted or otherwise not be displayed at connected resource 120.

The process may include, if the process determines (at 1040) that no mode-related restrictions should be applied, applying (at 1060) default restrictions, application-specific restrictions, or no display or interaction restrictions.

As shown, process 1000 may include analyzing (at 1070) content received from the source application. Such analysis may include applying various recognition models to screen content (or portions thereof). Some embodiments may analyze and apply such recognition models to other types of content. As one example, difference calculations may be used to identify areas of a UI or screen that may include distracting content, such as video.

Process 1000 may include determining (at 1080) whether any restriction criteria has been met, such as by evaluating received content with respect to any available restriction rules. Such a determination may be made based on the content analysis, various identified modes of operation, restriction modes and/or other operating rules, and/or other appropriate criteria. Such an approach may allow for automatic detection of content types and application of restriction rules to such content types. Thus, for instance, even though a source application may not directly supply video or similar content, UI features and/or other elements may produce similar effects.

The process may include, if the process determines (at 1080) that the restriction criteria has been met, applying (at 1090) a filter to the received content, blocking such content, and/or otherwise manipulating the content, as appropriate.

Figure 11:
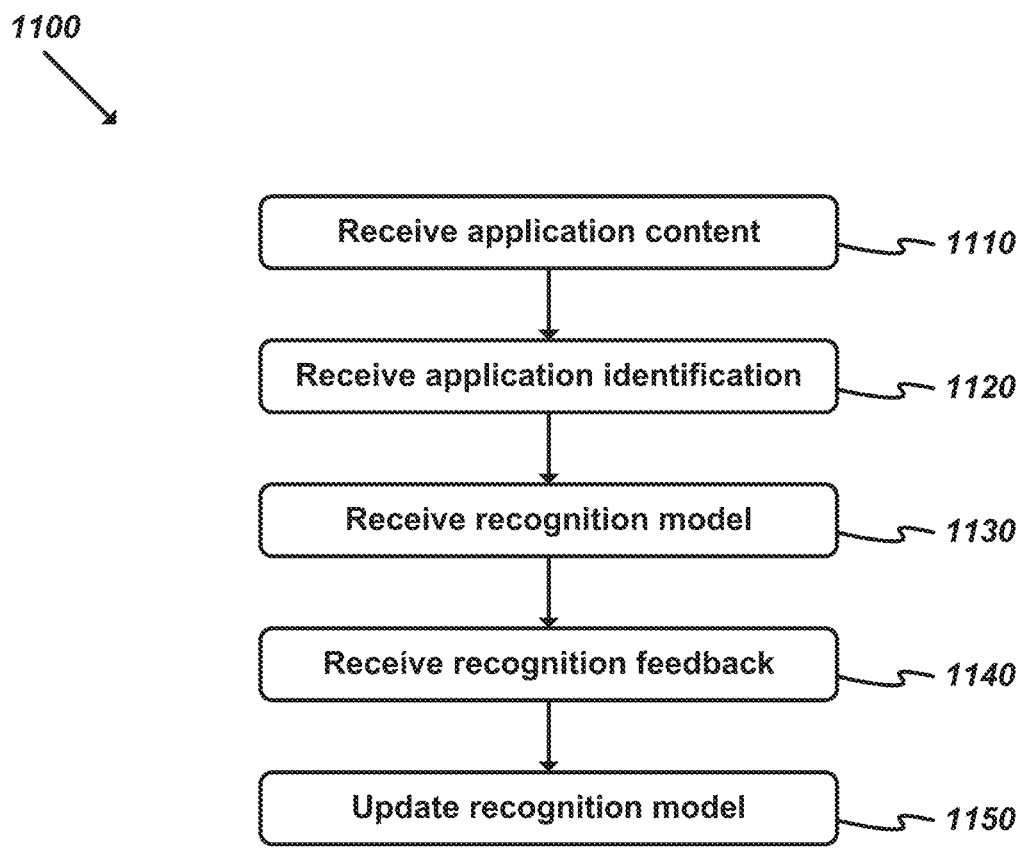
FIG. 11 illustrates a flow chart of an exemplary process for applying machine learning to generate or update application recognition models.

FIG. 11 illustrates an example process 1100 for applying machine learning to generate or update application recognition models and/or other models, rules, or elements described herein. The process may be performed whenever additional model training data is available. In some embodiments, process 1100 may be performed by gateway manager 610, and may be specifically performed by model trainer 650.

Machine learning algorithms based on neural networks (NN) have shown very good results for various computer vision and image classification tasks. In some embodiments, gateway manager 610 may be used to generate, train, and/or otherwise manipulate recognition models and/or associated objects such as rule objects. Rule objects that are part of a recognition model may include parameters such as NN model and NN model type associated under an algorithm specific data section: The NN model parameter may store the trained neural network model in a format that could be read by the machine learning library used by the recognition engine 525. The NN model type parameter may describe the type of neural network model provided in the NN model field.

There are many off the shelf tools and libraries that allow for quick training and use of image classification models based on neural networks. One such library is the Google ML Kit. Such tools may run on the user device 110 and use a provided custom neural network model to classify images. Another such library is the Vision framework from Apple that is available on iOS devices. The Vision framework is optimized for iOS devices and allows to use of custom Core ML models perform various machine learning tasks. The Core ML model may be associated, as a NN model, with a rule that is part of a larger recognition model. The recognition engine 525 may utilize multiple neural network libraries and make a selection based on rule data such as NN model type.

As shown, process 1100 may include receiving (at 1110) application content. Such content may include video content, screen content, UI elements, photographic elements, and/or other content associated with a source application. Such content may be received from a resource such as gateway manager 610 via repository 630.

Process 1100 may include receiving (at 1120) application identification associated with the received content (if available). For instance, screens (or other content) used by individual gateways 100 to identify applications (or other elements) may be sent, with the identity of any matching application identified by the gateway 100, to gateway manager 610.

The process may include receiving (at 1130) a recognition model associated with the identification received at 1120. Such information may be provided by the gateway 100 to gateway manager 610 for storage and association to the application content and/or identification (if any).

As shown, process 1100 may include receiving (at 1140) recognition feedback that may be used to train the model received at 1130. For instance, a user (or other ML recognition model) may identify the application based on the received content.

Process 1100 may include updating (at 1150) the recognition model based on the received feedback. For instance, if an application was correctly identified by a model, a reward may be applied to the model, whereas if an application was incorrectly identified, a penalty may be applied to the model.

Process 1100, and/or similar processes, may be used to apply machine learning to the various models, rules, algorithms, etc. described herein.

Separate models (stored as separate rule elements) may be trained for each of the supported applications. However, such an approach may slow down the classification process at the gateway 100 as the recognition engine 525 must evaluate multiple models. Alternatively, all the supported applications could be trained in a single NN model in one rule. Depending on the accuracy of the combined model, a hybrid approach may be used, where most of the applications are trained into a single NN model, but a subset of available applications and/or screen modes (e.g., keyboard mode) may be trained in a separate NN model and rule.

The determination whether to use one rule with all applications or some combination of separate rules, may be made during the training process using a meta-learning approach of experimenting with different combinations and selecting the combination that produces the best overall result (e.g., as indicated by highest accuracy and performance).

The various image recognition algorithms described herein may utilize trained models to correctly classify captured screen images. Such training may be performed as an off-line process by the gateway manager 610.

In order to train the recognition models, model trainer 650 may need a large set of example images of screens taken from each of the supported applications. In addition, there is a need for non-application images (e.g., "negative" examples) that may assist with training and model evaluation tasks. The screens may be captured manually, through an automated process or a combination of the two. The captured images may be stored in an image repository (e.g., an image repository included at repository 630).

During the manual screen capture process, one or more human operators (or "analysts") may run the application on a user device 110 or user device emulator and collect captured screen images. The analysts may then annotate the captured screen images with the correct labels. During this process, the analysts should try to visit every possible screen and utilize different application operating modes. Screen images may be collected for different user device models, screen resolutions, screen orientations, display modes (e.g., "night", "day", etc.), etc.

Using manual screen collection may be laborious and time consuming, especially if the process needs to be repeated for each new version of a target application. In some embodiments, an automated application capture process may be utilized. The automated process may interact with the user device 110 in similar ways to the screen capture and user input described herein. The automated application capture process may utilize application debug interfaces (such as ADB for Android or XCTest for iOS) that allow detection of the active application, screens, and/or UI widgets. As a result, the automated application capture process may "walk" through all screens and application modes and capture example screenshots during that process. In addition, the automated application capture process may be able to correctly label the images, as the current application and screen ID are known.

In some embodiments, a human operator may generate an application interaction path by recording a set of input events that may be played back by the automated application capture process and collect screenshots during the playback process.

Screen capture images collected using a manual or automated process may be stored to an image repository that may include a database of training and evaluation images captured for the different versions of the applications. Such an image repository may be a component of repository 630. The image repository may store label information associated with the captured images. The images may be categorized by application, application version, and/or other appropriate attributes.

A model training process of some embodiments may perform the model training. The model training process may be configured as to which type(s) of models to train and which algorithm(s) to use. The model training process may be configured with multiple possible algorithms and input parameters. The model training process may utilize meta-training to determine the best combination of algorithms, input parameters, and/or other relevant attributes.

Images may be retrieved from the image repository and run through the various training algorithms in order to produce recognition models. The retrieved images may include training images and evaluation images (that may be manually specified or randomly selected from the training set). The recognition models may be evaluated and scored using the set of evaluation images (that may also be retrieved from the image repository). If the model meets some specified quality criteria (e.g., by exceeding a score threshold), or is an improvement relative to other models, the updated model may be stored in a model repository and tagged with the correct version.

The model repository may be a database that stores the latest recognition models as generated by the model training process. The recognition models may be versioned and have an associated evaluation score or other performance metric(s). If the evaluation score exceeds a specified threshold value, the recognition model may be uploaded to the gateway manager 610 and the associated application catalog record 590.

As a specific model (and/or rule) training example, color matching rules may be trained using a set of training images by using model data parameters as input parameters for the training algorithm.

Input parameters for a training algorithm may include a list of allowed image operations and a merging color bins threshold that may define the maximum number of extra color bins that may be allowed for two rules to be merged. The input parameters may be defined by a human operator and/or may be learned using standard meta learning techniques.

The training process may generate or retrieve an empty training model. For each training image, the training process may extract the label(s) associated with the image. Such labels may typically be extracted from the file name or from a separate lookup table. For each training image and for each supported image operation, the training process may apply the image operation to the training image and store the result as a current training image, calculate the color bins as described in reference to the color matching classification algorithm, and store the result as candidate rule.

For each training image, the training process may evaluate the candidate rules for the current training image and select the rule that has the fewest number of color bins.

For each candidate rule, the training process may search for other rules in the training model that have the same label. If no such rules are found, the candidate rule may be added to the training model. If a rule with the same label is found, the candidate rule may be merged with the existing rule by checking whether the candidate rule has fewer than the merging color bins threshold number (or other specified threshold) of extra colors. If the candidate rule has fewer than the threshold, the color bins from the candidate rule may be combined with the color bins from the existing rule. If the candidate rule has more extra colors than the merging color bins threshold number, the candidate rule may be added to the training model.

One of ordinary skill in the art will recognize that processes 700-1100 may be implemented in various different ways without departing from the scope of the disclosure. For instance, the elements may be implemented in a different order than shown. As another example, some embodiments may include additional elements or omit various listed elements. Elements or sets of elements may be performed iteratively and/or based on satisfaction of some performance criteria. Non-dependent elements may be performed in parallel.

The processes and modules described above may be at least partially implemented as software processes that may be specified as one or more sets of instructions recorded on a non-transitory storage medium. These instructions may be executed by one or more computational element(s) (e.g., microprocessors, microcontrollers, digital signal processors (DSPs), application-specific integrated circuits (ASICs), field programmable gate arrays (FPGAs), other processors, etc.) that may be included in various appropriate devices in order to perform actions specified by the instructions.

As used herein, the terms "computer-readable medium" and "non-transitory storage medium" are entirely restricted to tangible, physical objects that store information in a form that is readable by electronic devices.

Figure 12:
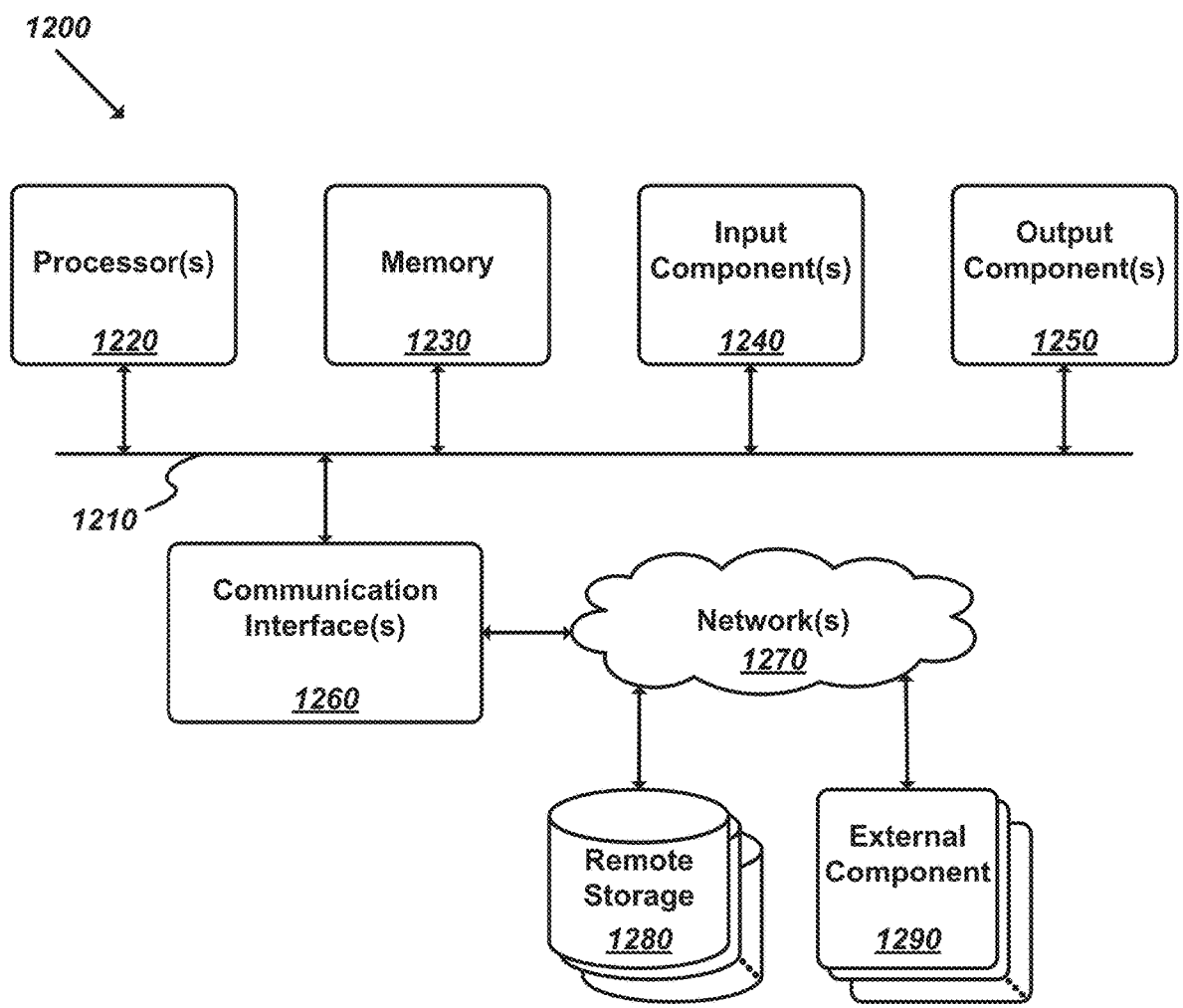
FIG. 12 illustrates a schematic block diagram of one or more exemplary devices used to implement various embodiments.

FIG. 12 illustrates a schematic block diagram of an exemplary device (or system or devices) 1200 used to implement some embodiments. For example, the systems and/or devices described above in reference to FIG. 1-FIG. 6 may be at least partially implemented using device 1200. As another example, the processes described in reference to FIG. 7-FIG. 11 may be at least partially implemented using device 1200.

Device 1200 may be implemented using various appropriate elements and/or sub-devices. For instance, device 1200 may be implemented using one or more personal computers (PCs), servers, mobile devices (e.g., smartphones), tablet devices, wearable devices, and/or any other appropriate devices. The various devices may work alone (e.g., device 1200 may be implemented as a single smartphone) or in conjunction (e.g., some components of the device 1200 may be provided by a mobile device while other components are provided by a server).

As shown, device 1200 may include at least one communication bus 1210, one or more processors 1220, memory 1230, input components 1240, output components 1250, and one or more communication interfaces 1260.

Bus 1210 may include various communication pathways that allow communication among the components of device 1200. Processor 1220 may include a processor, microprocessor, microcontroller, digital signal processor, logic circuitry, and/or other appropriate processing components that may be able to interpret and execute instructions and/or otherwise manipulate data. Memory 1230 may include dynamic and/or non-volatile memory structures and/or devices that may store data and/or instructions for use by other components of device 1200. Such a memory device 1230 may include space within a single physical memory device or spread across multiple physical memory devices.

Input components 1240 may include elements that allow a user to communicate information to the computer system and/or manipulate various operations of the system. The input components may include keyboards, cursor control devices, audio input devices and/or video input devices, touchscreens, motion sensors, etc. Output components 1250 may include displays, touchscreens, audio elements such as speakers, indicators such as light-emitting diodes (LEDs), printers, haptic or other sensory elements, etc. Some or all of the input and/or output components may be wirelessly or optically connected to the device 1200.

Device 1200 may include one or more communication interfaces 1260 that are able to connect to one or more networks 1270 or other communication pathways. For example, device 1200 may be coupled to a web server on the Internet such that a web browser executing on device 1200 may interact with the web server as a user interacts with an interface that operates in the web browser. Device 1200 may be able to access one or more remote storages 1280 and one or more external components 1290 through the communication interface 1260 and network 1270. The communication interface(s) 1260 may include one or more application programming interfaces (APIs) that may allow the device 1200 to access remote systems and/or storages and also may allow remote systems and/or storages to access device 1200 (or elements thereof).

It should be recognized by one of ordinary skill in the art that any or all of the components of computer system 1200 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

Device 1200 may perform various operations in response to processor 1220 executing software instructions stored in a computer-readable medium, such as memory 1230. Such operations may include manipulations of the output components 1250 (e.g., display of information, haptic feedback, audio outputs, etc.), communication interface 1260 (e.g., establishing a communication channel with another device or component, sending and/or receiving sets of messages, etc.), and/or other components of device 1200.

The software instructions may be read into memory 1230 from another computer-readable medium or from another device. The software instructions stored in memory 1230 may cause processor 1220 to perform processes described herein. Alternatively, hardwired circuitry and/or dedicated components (e.g., logic circuitry, ASICs, FPGAs, etc.) may be used in place of or in combination with software instructions to implement processes described herein. Thus, implementations described herein are not limited to any specific combination of hardware circuitry and software.

The actual software code or specialized control hardware used to implement an embodiment is not limiting of the embodiment. Thus, the operation and behavior of the embodiment has been described without reference to the specific software code, it being understood that software and control hardware may be implemented based on the description herein.

While certain connections or devices are shown, in practice additional, fewer, or different connections or devices may be used. Furthermore, while various devices and networks are shown separately, in practice the functionality of multiple devices may be provided by a single device or the functionality of one device may be provided by multiple devices. In addition, multiple instantiations of the illustrated networks may be included in a single network, or a particular network may include multiple networks. While some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

I claim:

1. A device, comprising:
   one or more processors configured to:
   establish a connection from a gateway to a connected resource;
   identify, at the gateway, a source application running on the gateway, based on screen image data generated by the source application, by:
   receiving a set of application matching rules, each application matching rule associated with a particular source application;
   applying each application matching rule in the set of application matching rules to the screen image data; and
   identifying the source application based on the applying of each application matching rule in the set of application matching rules;
   project, from the gateway to the connected resource, content received from the source application;
   receive, at the gateway, user input information from the connected resource; and
   apply the received user input information to the source application.

2. The device of claim 1, wherein identifying, at the gateway, the source application comprises:
   generating a set of matching scores based on the applying each application matching rule in the set of application matching rules to the screen image data; and
   identifying the source application by selecting the particular source application associated with the application matching rule generating a highest matching score from the set of matching scores.

3. The device of claim 2, wherein the application matching rules are received from an external gateway manager service.

4. The device of claim 1, the one or more processors further configured to:
   determine that a parallel control path from the connected resourced is available, wherein the parallel control path comprises a user device interface associated with the connected resource and the parallel control path is separate from a projection path that carries projected content received from the source application; and
   send, from the gateway to the connected resource, input configuration parameters that define an input mode, wherein applying the received user input information to the source application comprises receiving absolute movement event information related to a user input event and translating the received absolute movement event information into relative movement event information based at least partly on the input mode and receiving the relative movement event information over the parallel control path.

5. The device of claim 4, wherein applying the received user input information to the source application further comprises automatically docking a cursor, in order to correct for relative movement errors, by receiving, over the parallel control path, a set of docking commands comprising relative movement events that exceed dimensions of a user device interface associated with the gateway and applying the received set of docking commands to the user device interface.

6. The device of claim 1, wherein projecting the content received from the source application comprises:
   identifying, at the gateway, an operating mode associated with the connected resource;
   identifying, at the gateway, a set of mode-related restrictions associated with the operating mode; and
   applying, at the gateway, the set of mode related restrictions to the projected content.

7. The device of claim 6, wherein identifying the operating mode associated with the connected resource comprises determining movement of the connected resource exceeds a movement speed threshold and applying the set of mode related restrictions to the projected content comprises blocking at least one user interface element from being projected.

8. The device of claim 1, wherein applying each application matching rule in the set of application matching rules to the screen image data comprises applying color bin matching or image template matching.

9. A non-transitory computer-readable medium, storing a plurality of processor executable instructions to:
   establish a connection from a gateway to a connected resource;
   identify, at the gateway, a source application running on the gateway, based on screen image data generated by the source application, by:
   receiving a set of application matching rules, each application matching rule associated with a particular source application;
   applying each application matching rule in the set of application matching rules to the screen image data; and
   identifying the source application based on the applying of each application matching rule in the set of application matching rules;
   project, from the gateway to the connected resource, content received from the source application;
   receive, at the gateway, user input information from the connected resource; and
   apply the received user input information to the source application.

10. The non-transitory computer-readable medium of claim 9, wherein identifying, at the gateway, the source application comprises:
    generating a set of matching scores based on the applying each application matching rule in the set of application matching rules to the screen image data; and
    identifying the source application by selecting the particular source application associated with the application matching rule generating a highest matching score from the set of matching scores.

11. The non-transitory computer-readable medium of claim 10, wherein the application matching rules are received from an external gateway manager service.

12. The non-transitory computer-readable medium of claim 9, the plurality of processor executable instructions further to:
  determine that a parallel control path from the connected resourced is available, wherein the parallel control path comprises a user device interface associated with the connected resource and the parallel control path is separate from a projection path that carries projected content received from the source application; and
  send, from the gateway to the connected resource, input configuration parameters that define an input mode, wherein applying the received user input information to the source application comprises receiving absolute movement event information related to a user input event and translating the received absolute movement event information into relative movement event information based at least partly on the input mode and receiving the relative movement event information over the parallel control path.

13. The non-transitory computer-readable medium of claim 12, wherein applying the received user input information to the source application further comprises automatically docking a cursor, in order to correct for relative movement errors, by receiving, over the parallel control path, a set of docking commands comprising relative movement events that exceed dimensions of a user device interface associated with the gateway and applying the received set of docking commands to the user device interface.

14. The non-transitory computer-readable medium of claim 9, wherein projecting the content received from the source application comprises:
  identifying, at the gateway, an operating mode associated with the connected resource;
  identifying, at the gateway, a set of mode-related restrictions associated with the operating mode; and
  applying, at the gateway, the set of mode related restrictions to the projected content.

15. The non-transitory computer-readable medium of claim 14, wherein identifying the operating mode associated with the connected resource comprises determining movement of the connected resource exceeds a movement speed threshold and applying the set of mode related restrictions to the projected content comprises blocking at least one user interface element from being projected.

16. The device of claim 9, wherein applying each application matching rule in the set of application matching rules to the screen image data comprises applying color bin matching or image template matching.

17. A method comprising:
  establishing a connection from a gateway to a connected resource;
  identifying, at the gateway, a source application running on the gateway, based on screen image data generated by the source application, by:
    receiving a set of application matching rules, each application matching rule associated with a particular source application;
    applying each application matching rule in the set of application matching rules to the screen image data; and
    identifying the source application based on the applying of each application matching rule in the set of application matching rules;
  projecting, from the gateway to the connected resource, content received from the source application;
  receiving, at the gateway, user input information from the connected resource; and
  applying the received user input information to the source application.

18. The method of claim 17, wherein identifying, at the gateway, the source application comprises:
  generating a set of matching scores based on the applying each application matching rule in the set of application matching rules to the screen image data; and
  identifying the source application by selecting the particular source application associated with the application matching rule generating a highest matching score from the set of matching scores.

19. The method of claim 18, wherein the application matching rules are received from an external gateway manager service.

20. The method of claim 17, further comprising:
  determining that a parallel control path from the connected resourced is available, wherein the parallel control path comprises a user device interface associated with the connected resource and the parallel control path is separate from a projection path that carries projected content received from the source application; and
  sending, from the gateway to the connected resource, input configuration parameters that define an input mode, wherein applying the received user input information to the source application comprises receiving absolute movement event information related to a user input event and translating the received absolute movement event information into relative movement event information based at least partly on the input mode and receiving the relative movement event information over the parallel control path.

21. The method of claim 20, wherein applying the received user input information to the source application further comprises automatically docking a cursor, in order to correct for relative movement errors, by receiving, over the parallel control path, a set of docking commands comprising relative movement events that exceed dimensions of a user device interface associated with the gateway and applying the received set of docking commands to the user device interface.

22. The method of claim 17, wherein:
  projecting the content received from the source application comprises:
    identifying, at the gateway, an operating mode associated with the connected resource;
    identifying, at the gateway, a set of mode-related restrictions associated with the operating mode; and
    applying, at the gateway, the set of mode related restrictions to the projected content; and
  applying the set of mode related restrictions to the projected content, and
  identifying the operating mode associated with the connected resource comprises:
    determining movement of the connected resource exceeds a movement speed threshold and applying the set of mode related restrictions to the projected content comprises blocking at least one user interface element from being projected.

23. The device of claim 17, wherein applying each application matching rule in the set of application matching rules to the screen image data comprises applying color bin matching or image template matching.

* * * * *